US011497996B2

(12) United States Patent
Imai et al.

(10) Patent No.: US 11,497,996 B2
(45) Date of Patent: Nov. 15, 2022

(54) GAME DEVICE, CONTROL METHOD, CONTROL PROGRAM, AND COMPUTER-READABLE RECORDING MEDIUM HAVING CONTROL PROGRAM RECORDED THEREIN

(71) Applicant: GREE, INC., Tokyo (JP)

(72) Inventors: Hitoshi Imai, Tokyo (JP); Gaku Kawamura, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/957,810

(22) PCT Filed: Dec. 25, 2018

(86) PCT No.: PCT/JP2018/047688
§ 371 (c)(1),
(2) Date: Jun. 25, 2020

(87) PCT Pub. No.: WO2019/131690
PCT Pub. Date: Jul. 4, 2019

(65) Prior Publication Data
US 2021/0060428 A1 Mar. 4, 2021

(30) Foreign Application Priority Data
Dec. 25, 2017 (JP) .............................. JP2017-248515

(51) Int. Cl.
*A63F 13/428* (2014.01)
*A63F 13/55* (2014.01)

(52) U.S. Cl.
CPC ............ *A63F 13/428* (2014.09); *A63F 13/55* (2014.09); *A63F 2300/8082* (2013.01)

(58) Field of Classification Search
CPC ...... A63F 13/211; A63F 13/428; A63F 13/55; A63F 2300/8082; G06F 3/01
See application file for complete search history.

(56) References Cited

U.S. PATENT DOCUMENTS 7,878,905 B2 * 2/2011 Weston .................. A63F 13/825
463/39
7,896,742 B2 * 3/2011 Weston .................... A63F 13/10
463/37

(Continued)

FOREIGN PATENT DOCUMENTS

JP   2001-224858 A   8/2001
JP   2006-314434 A   11/2006

(Continued)

OTHER PUBLICATIONS

Jan. 25, 2022 Office Action issued in Japanese Patent Application No. 2017-248515.

*Primary Examiner* — William H McCulloch, Jr.
(74) *Attorney, Agent, or Firm* — Oliff PLC

(57) ABSTRACT

The purpose of the present invention is to provide a game device, etc., that improves the operability of an operation unit. The game device comprises: a storage unit that stores an image of a first object; a display unit that displays an image of at least the first object; first and second operation units for outputting operation information on the basis of a player action; a determination unit that determines whether or not the output operation information fulfills a prescribed condition; an identification unit that identifies, as an object operation unit, the operation unit that output operation information fulfilling the prescribed condition, out of the first and second operation units; and an object control unit that changes the first object displayed on the display unit, in accordance with the operation information from the object operation unit.

11 Claims, 17 Drawing Sheets

(56) References Cited

U.S. PATENT DOCUMENTS

| | | | | |
|---|---|---|---|---|
| 7,938,725 | B2* | 5/2011 | Okamura | A63F 13/428 |
| | | | | 463/37 |
| 8,525,783 | B2* | 9/2013 | Sato | A63F 13/42 |
| | | | | 345/158 |
| 10,518,171 | B2* | 12/2019 | Akifusa | A63F 13/235 |
| 10,905,958 | B2* | 2/2021 | Imai | A63F 13/57 |
| 11,094,106 | B2* | 8/2021 | Tamaoki | A63F 13/213 |
| 11,161,040 | B2* | 11/2021 | Imai | A63F 13/23 |
| 11,278,796 | B2* | 3/2022 | Weston | A63F 13/245 |
| 2005/0143173 | A1* | 6/2005 | Barney | A63F 13/825 |
| | | | | 463/37 |
| 2006/0154726 | A1* | 7/2006 | Weston | A63F 13/98 |
| | | | | 463/37 |
| 2008/0014835 | A1* | 1/2008 | Weston | A63F 13/327 |
| | | | | 446/484 |
| 2008/0076565 | A1* | 3/2008 | Okamura | A63F 13/211 |
| | | | | 463/37 |
| 2008/0309615 | A1* | 12/2008 | Sato | A63F 13/10 |
| | | | | 345/156 |
| 2017/0354865 | A1* | 12/2017 | Akifusa | A63F 13/219 |
| 2019/0321728 | A1* | 10/2019 | Imai | A63F 13/525 |
| 2020/0360807 | A1* | 11/2020 | Imai | A63F 13/211 |
| 2021/0060428 | A1* | 3/2021 | Imai | G06F 3/01 |
| 2021/0113925 | A1* | 4/2021 | Imai | A63F 13/537 |
| 2022/0016525 | A1* | 1/2022 | Imai | A63F 13/57 |

FOREIGN PATENT DOCUMENTS

| | | | |
|---|---|---|---|
| JP | 2007-75353 A | 3/2007 | |
| JP | 2009-284953 A | 12/2009 | |
| JP | 2018-064649 A | 4/2018 | |

* cited by examiner

| OPERATION DEVICE IDENTIFICATION INFORMATION |
|---|
| X-AXIS DIRECTION ACCELERATION INFORMATION |
| Y-AXIS DIRECTION ACCELERATION INFORMATION |
| Z-AXIS DIRECTION ACCELERATION INFORMATION |
| X-AXIS ANGULAR VELOCITY INFORMATION |
| Y-AXIS ANGULAR VELOCITY INFORMATION |
| Z-AXIS ANGULAR VELOCITY INFORMATION |
| INPUT PORTION OPERATION INFORMATION |

GAME DEVICE, CONTROL METHOD, CONTROL PROGRAM, AND COMPUTER-READABLE RECORDING MEDIUM HAVING CONTROL PROGRAM RECORDED THEREIN

TECHNICAL FIELD

This invention relates to a game device, a control method, a control program, and a computer-readable recording medium having the control program recorded therein.

TECHNICAL BACKGROUND

Conventionally, a game device is known which advances a game based on operation information from a controller grasped by a player. For example, in a game device provided with a device main body and a controller, operation information from a motion sensor built in the controller is transmitted to the device main body by wire or wireless communication, and the device main body can execute a game process based on the received operation information.

For example, in Patent Document 1, a game system is disclosed which is provided with (i) a controller having an accelerometer and (ii) a game device. In this game system, as a player grasps the controller and performs various movements, measurement data measured by the accelerometer is transmitted to the game device as operation data. The game device performs operation control of an object to be operated based on the received operation data. With such a game system, a player can reflect his own arm and/or hand movements in a game and obtain a sense of immersion in a partial game space.

PRIOR ART DOCUMENT

Patent Document

Patent Document 1: JP2007-75353A

SUMMARY OF INVENTION

However, if a player plays a game by using a plurality of operation portions, it was necessary to set, in a game device, a correspondence between each of the plurality of operation portions and the respective object to be operated. For example, in such a game device, before the game starts or during the game, the player must perform a complex setting operation for setting a correspondence between each of the plurality of operation portions and the respective object to be operated. Thus, in the game device, before the game starts or during the game, it became necessary to automate the setting operation.

This disclosure is to resolve such a problem. An object is to provide a game device that automates a setting operation and improves operability of an operation portion, a control method, a control program, and a computer-readable recording medium having the control program recorded therein.

A game device is provided with a memory that stores an image of a first object; a display processor that displays at least the image of the first object; first and second operation portions for outputting operation information based on a movement of a player; a determination portion that determines whether the operation information that has been output satisfies a specified condition; and an identification portion that identifies, as a parameter operation portion, among the first and second operation portions, the operation portion that has output the operation information satisfying the specified condition.

In the game device, it is preferred that a parameter controller is provided that changes a parameter value related to the first object according to the operation information from the parameter operation portion.

In the game device, it is preferred that the display processor displays the parameter value in a display mode that corresponds to the change.

In the game device, it is preferred that each of the first and second operation portions has an output portion that outputs the operation information, which has been measured by a motion sensor; and the specified condition is that, based on the operation information output from the output portion, it is determined that the operation portion having the output portion is performing a specified motion.

In the game device, it is preferred that the specified motion is a reciprocating motion of the parameter operation portion and that the parameter controller increases the parameter value as the number of reciprocating motions of the parameter operation portion per specified time increases.

In the game device, it is preferred that the specified motion is a reciprocating motion of the parameter operation portion, and that the parameter controller increases the parameter value as displacement of one cycle of reciprocating motion of the parameter operation portion per specified time increases.

In the game device, it is preferred that the memory stores information related to a virtual space; an object controller is further provided that moves a second object related to the first object within the virtual space, based on the parameter value changed by the parameter controller; and the display processor displays an image of the second object that moves within the virtual space.

In the game device, it is preferred that the identification portion identifies, as an object operation portion, among the first and second operation portions, the operation portion different from the parameter operation portion; and the object controller changes the image of the first object according to the operation information from the object operation portion.

A control method is a control method by a game device comprising (i) a memory that stores an image of a first object and (ii) first and second operation portions for outputting operation information based on a movement of a player. The control method includes displaying at least an image of the first object; determining whether the operation information that has been output satisfies a specified condition; and identifying, as a parameter operation portion, among the first and second operation portions, the operation portion that has output the operation information satisfying the specified condition.

A control program is a control program of a game device comprising (i) a memory that stores an image of a first object and (ii) first and second operation portions for outputting operation information based on a movement of a player. The control program causes the game device to execute displaying at least the image of the first object; determining whether the operation information that has been output satisfies a specified condition; and identifying, as a parameter operation portion, among the first and second operation portions, the operation portion that has output the operation information satisfying the specified condition.

A computer-readable recording medium stores a control program causing a computer, comprising (i) a memory that stores an image of a first object and (ii) first and second operation portions for outputting operation information based on a movement of a player, to execute displaying at least the image of the first object; determining whether the operation information that has been output satisfies a specified condition; and identifying, as a parameter operation portion, among the first and second operation portions, the operation portion that has output the operation information satisfying the specified condition.

Operability of the operation portions provided with the game device can be improved by the game device, the control method by the game device, the game device, and the computer-readable recording medium having the control program recorded therein.

BRIEF DESCRIPTION OF DRAWINGS

FIG. 7 is a diagram showing an example of a data structure of operation information output by the first and second operation devices.

MODES TO IMPLEMENT INVENTION

Hereinafter, with reference to the drawings, various modes of this invention will be explained. However, a technical scope of this invention is not limited to those modes, and extends to the invention recited in the scope of the claims and its equivalents.

Figure 1:
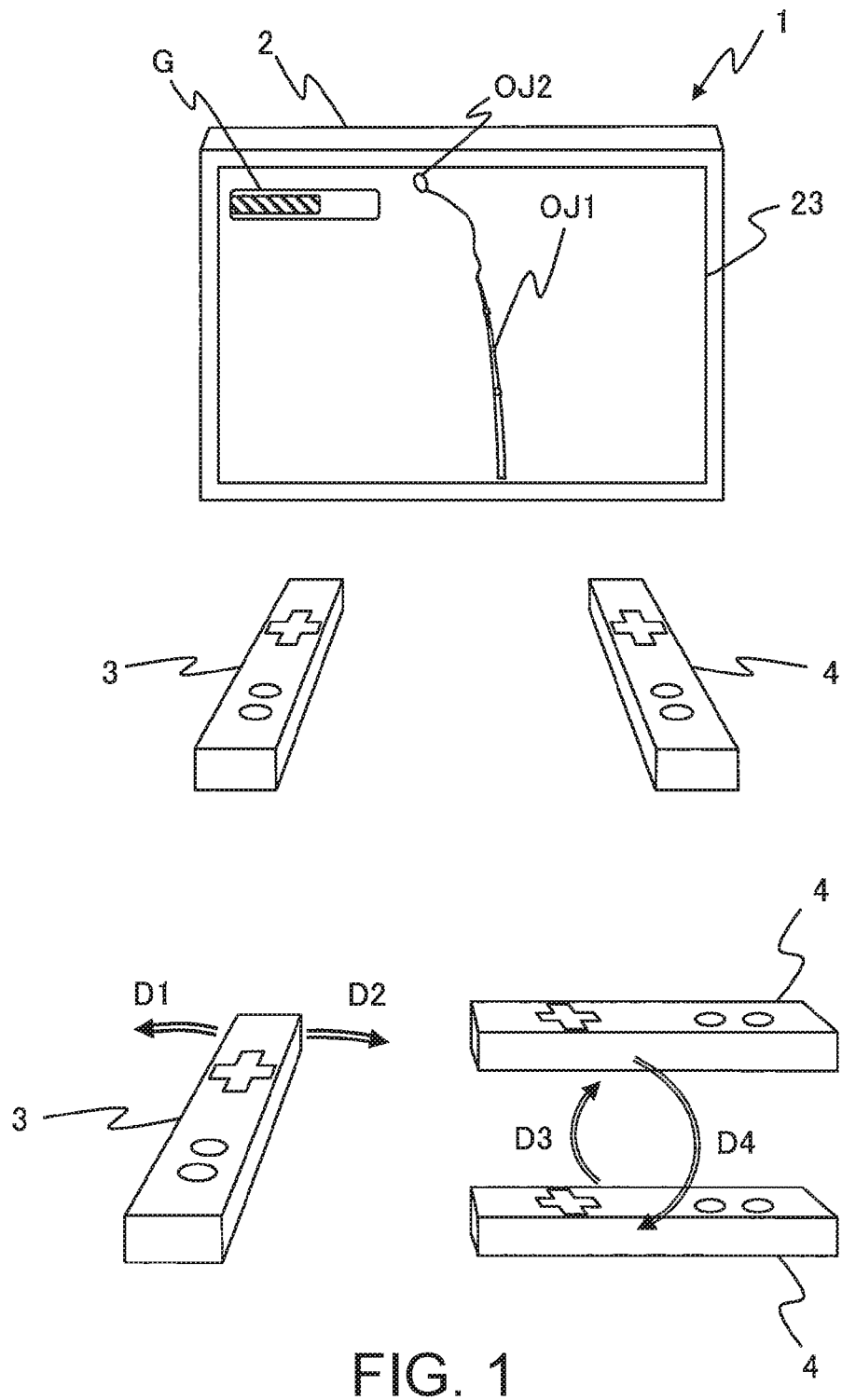
FIG. 1 is a schematic diagram for explaining an example of a game provided by a game device.

FIG. 1 is a diagram for explaining an example of a game provided by a game device 1. Additionally, the game device 1 is a home game device such as a console game machine, a personal computer, a multifunctional mobile phone (a so-called "smartphone"), a tablet terminal, a tablet personal computer, or the like.

The game device 1 in at least some modes of this invention displays a virtual space including at least one or more types of objects. The virtual space is defined by three coordinate axes. Various objects having three-dimensional coordinates are arranged in the virtual space. Additionally, the virtual space can be defined by two coordinate axes. In this case, various objects having two-dimensional coordinates are arranged in the virtual space.

Shapes of the objects are shapes imitating specified objects (vehicles, trees, people, animals, buildings, or the like). The shapes of the objects may be cuboid shapes, rectangular shapes, cylindrical shapes, spherical shapes, plate shapes, or the like. The shapes of the objects may deform with the passing of time.

A virtual camera is arranged at a specified position of the virtual space. Three-dimensional coordinates of various objects arranged in the virtual space are projected onto a specified two-dimensional screen plane arranged in a line-of-sight direction of the virtual camera. The game device displays the projected two-dimensional screen plane on a display device or the like.

A plurality of specified objects from among the objects in the virtual space is controlled so as to change according to operation information based on a player's movement. Furthermore, a change of each object includes, for example, traveling of the object in the virtual space and deformation of an outer shape of the object.

Hereinafter, with reference to FIG. 1, an example of a game provided by the game device 1 is explained. In an example shown in FIG. 1, the game device 1 is provided with a game processing device 2 provided with a display portion 23, a first operation device 3, and a second operation device 4.

The game processing device 2 (i) obtains operation information based on a player's movement, and (ii) generates (a) image data of an image showing a gauge G corresponding to a parameter that is changed according to the obtained operation information and (b) image data for displaying the virtual space including a second object OJ2 that moves according to the parameter. The game processing device 2 displays on the display portion 23 (i) the image showing the gauge G and (ii) an image showing the virtual space, based on the generated image data.

The first operation device 3 and the second operation device 4 are each provided with a motion sensor. A player grasps the first operation device 3 with the left hand and the second operation device 4 with the right hand, and performs various movements related to a game provided by the game device 1. The motion sensors provided respectively in the first operation device 3 and the second operation device 4 generate operation information according to various movements of the player. The first operation device 3 and the second operation device 4 each output the generated operation information to the game processing device 2.

Additionally, the player may grasp the first operation device 3 with the right hand and the second operation device 4 with the left hand. Furthermore, the first operation device 3 and the second operation device 4 can be worn on (i) a left or right upper arm or lower arm, (ii) a left or right leg, or the like of the player. As long as the player's movement can be detected, the first operation device 3 and the second operation device 4 can be worn at any part of the player's body. Additionally, the first operation device 3 is an example of a first operation portion, and the second operation device 4 is an example of a second operation portion.

The motion sensors are sensors for measuring a player's movement and are, for example, accelerometers. The motion sensors may be angular velocity sensors, displacement sensors, orientation measurement sensors, image sensors, optical sensors, or the like. Additionally, the angular velocity sensors are, for example, gyro sensors. Furthermore, the orientation measurement sensors are, for example, geomagnetic sensors. The motion sensors can each have a plurality of sensors for measuring the movement of the player.

When the player grasping the first operation device 3 with the left hand and the second operation device 4 with the right hand performs a specified movement, the respective motion sensors of the first operation device 3 and the second operation device 4 output the respective operation information of the first operation device 3 and the second operation device 4. When the motion sensors are accelerometers, the motion sensor of the first operation device 3 detects acceleration of the first operation device 3 and outputs acceleration information showing detected acceleration. Additionally, the motion sensor of the second operation device 4 detects acceleration of the second operation device 4 and outputs acceleration information showing detected acceleration.

The first operation device 3 and the second operation device 4 output the respective operation information from the motion sensors to the game processing device 2. Upon obtaining the operation information, the game processing device 2 changes objects corresponding to the respective operation information and generates image data for displaying a virtual space including the changed object(s). For example, if acceleration information is output as operation information, the game processing device 2 calculates a travel velocity of the object according to the acceleration information, and moves the object in the virtual space, based on the calculated travel velocity. The game processing device 2 displays on the display portion 23 an image showing the virtual space, based on the generated image data.

In the game device 1, the parameter value shown by the gauge G displayed on the display portion 23 changes based on the operation information from the operation portion that satisfies a second operation information condition, among the first operation device 3 and the second operation device 4. The second operation information condition is a condition in which, for example, it is determined that based on the operation information output from the motion sensor(s), the operation device including the motion sensor is performing a specified motion. The specified motion is, for example, a periodic motion. The periodic motion is a reciprocating motion and/or an oscillating motion in which the operation device repeats the movement in the first direction D3 and the movement in the second direction D4, a circular motion about a specified axis, or the like. Additionally, the specified axis of the circular motion may be displaced or rotated, and a trajectory of the circular motion does not have to be a perfect circle. Furthermore, the specified motion is not limited to a periodic motion and may be any motion as long as it is a motion according to a specific movement of the player.

Hereinafter, as an example, a case will be described in which a game provided by the game device 1 is a fishing game that displays an image of the first object OJ1 imitating a fishing rod.

A player grasps one of the first operation device 3 and the second operation device 4 as a fishing rod and, for example, performs a casting action. Casting is an action of throwing a lure, bait, or the like onto a water surface (a sea surface, a lake surface, a river surface) during fishing. Additionally, a lure, bait, or the like is tied to a fishing line, and the fishing line is wound on a reel provided on a fishing rod grasped by an angler. A casting action is, for example, an action in which the angler takes back the fishing rod over the head and flicks in a forward direction. According to a casting action by the player, the motion sensor of the operation device grasped by the angler as a fishing rod outputs operation information, and the operation device grasped by the angler as a fishing rod outputs the operation information to the game processing device 2.

If the game processing device 2 determines that the obtained operation information satisfies the first operation information condition, it identifies the operation device that has output the operation information as an object operation device. For example, when acceleration information is output as operation information, if the obtained acceleration information exceeds a specified numerical value, the operation device that has output the acceleration information is identified as an object operation device. Hereinafter, the object operation device functions as an operation device for operating the first object OJ1 imitating a fishing rod. Additionally, the object operation device is an example of an object operation portion.

The game processing device 2 changes (moves, deforms, or the like) the first object OJ1, based on the operation information from the object operation device. The game processing device 2 generates image data for displaying a virtual space including the changed object and, based on the generated image data, displays on the display portion 23 an image showing the virtual space.

Next, the game processing device 2 moves the second object OJ2 related to the first object OJ1 according to the change of the first object OJ1. The second object OJ2 is, for example, an object imitating a lure, bait, or the like connected to the fishing rod through a fishing line.

The player grasps one of the first operation device 3 and the second operation device 4 as a handle of the reel provided on the fishing rod and, for example, performs an action of winding the reel. According to the player's action of winding the reel, the motion sensor of the operation device grasped as a handle by the player outputs the operation information, and the operation device grasped as a handle by the player outputs the operation information to the game processing device 2.

If the game processing device 2 determines that the obtained operation information satisfies the second operation information condition, it identifies the operation device that has output the operation information as a parameter operation device. For example, when acceleration information is output as operation information, the operation device for which it has been determined that the operation device that has output the acceleration information is performing a specified motion is identified as a parameter operation device. Hereinafter, the parameter operation device functions as an operation device that can apply tension to the fishing line in the virtual space by winding the handle. Additionally, the parameter operation device is an example of a parameter operation portion.

The game processing device 2 changes a parameter value corresponding to tension of the fishing line related to the first object imitating the fishing rod, based on a relationship between the operation information from the parameter operation device and the second object OJ2. The game processing device 2 (i) generates (a) an image of the gauge G showing the changed parameter value and (b) image data for displaying the virtual space including the second object OJ2 that moves toward the first object OJ1 according to the changed parameter value and (ii) displays on the display portion 23 an image showing the virtual space, based on the generated image data.

As described above, with reference to FIG. 1, in the game device 1, when the operation information from an operation device operated by the player satisfies the second operation information condition, that operation device is automatically identified as a parameter operation device for controlling the parameter value. Thus, even when the game device 1 is provided with a plurality of operation devices, even if the player does not perform any operation to set one of the plurality of operation devices as a parameter operation device, a parameter operation device can be automatically set. By so doing, the game device 1 can improve operability of the operation devices provided with the game device 1 and suppress the player from losing his immersion in the game.

Figure 2:
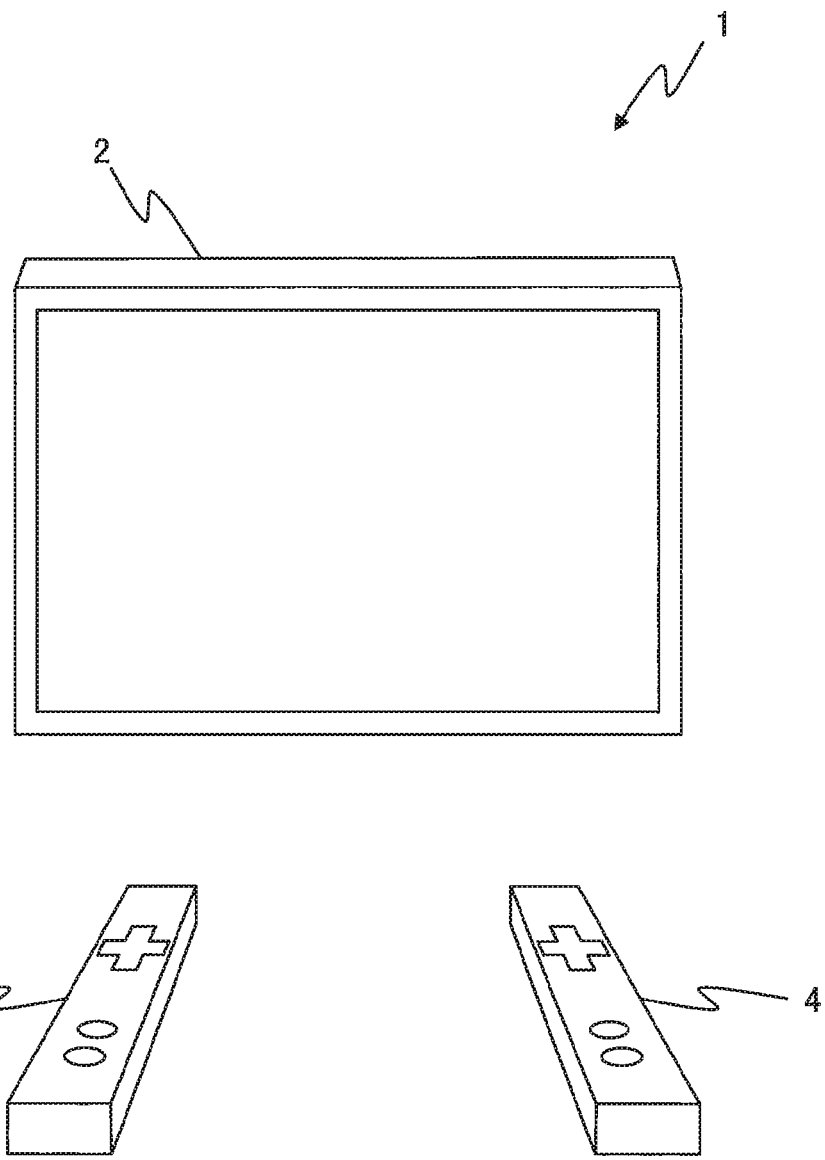
FIG. 2 is a diagram showing an example of a schematic configuration of the game device.

FIG. 2 is a diagram showing an example of a schematic configuration of the game device 1. The game device 1 is a home game device such as a console game machine or the like. The game processing device 2 has a first operation device 3 and a second operation device 4. Additionally, a home game device can be stationary or portable. Furthermore, the game device 1 can be a commercial game machine such as an arcade game machine installed in a specific facility. In addition, specific facilities are facilities for attracting customers such as amusement facilities, function facilities, event facilities, and the like. The game device 1 can have three or more operation devices.

The game processing device 2 can be any information processor as long as it can be connected to the operation devices. For example, the game processing device 2 can be a personal computer, a multifunctional mobile phone (a so-called "smartphone"), a tablet terminal, a tablet personal computer, a mobile phone (a so-called "feature phone"), a mobile music player, a notebook personal computer, or the like.

The game processing device 2 has functions that (i) obtain operation information, based on the player's movement, from the first operation device 3 and the second operation device 4 and (ii) display an image showing a virtual space including an object that changes according to the obtained operation information. Because of this, the game processing device 2 is provided with a communication portion 21, a memory 22, a display portion 23, and a processor 24. Hereinafter, with reference to FIG. 3, the communication portion 21, the memory 22, the display portion 23, and the processor 24 of the game processing device 2 will be explained.

Figure 3:
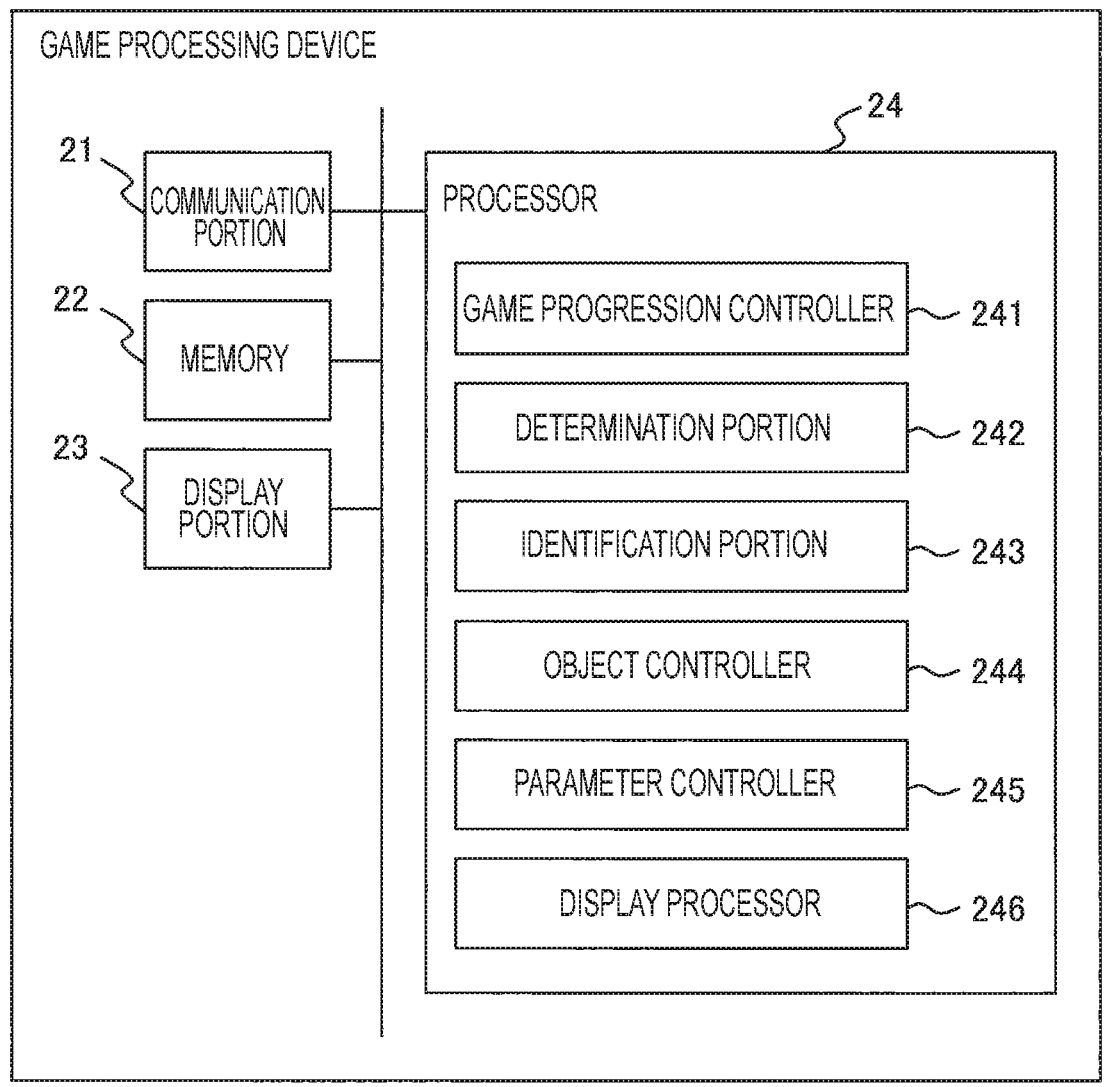
FIG. 3 is a diagram showing an example of a schematic configuration of a game processing device.

FIG. 3 is a diagram showing an example of a schematic configuration of the game processing device 2.

The communication portion 21 has an interface circuit for performing short-range wireless communication in accordance with a communication method such as Bluetooth (registered trademark) and receives radio waves broadcasted from the first operation device 3 and the second operation device 4, which will be described later. Additionally, the interface circuit included in the communication portion 21 is not limited to one for performing short-range wireless communication. For example, the communication portion 21 can have a receiver circuit for receiving various signals transmitted by infrared communication or the like. The communication portion 21 demodulates radio waves broadcasted from the first operation device 3 and the second operation device 4 into a specified signal and supplies the signal to the processor 24.

The memory 22 is provided with a semiconductor memory device such as a ROM (Read Only Memory), a RAM (Random Access Memory), and the like. The memory 22 stores an operating system program, a driver program, an application program, data, and the like that are used for processing in the processor 24. The driver program stored in the memory 22 is a communication device driver program that controls the communication portion 21, an output device driver program that controls the display portion 23, and the like. The application program stored in the memory 22 is a control program and the like that controls game progress. The data stored in the memory 22 is various data and the like that is used by the processor 24 and the like while the game is being played. Furthermore, the memory 22 can temporarily store temporary data related to specified processing.

Information stored in the memory 22 is, for example, (i) information regarding a virtual space (three-dimensional coordinates showing a position of a virtual camera, information regarding (a) a line-of-sight direction and (b) a field of view of a virtual camera, three-dimensional coordinates showing a size and a position of a two-dimensional screen plane, and the like) and (ii) information regarding various objects within the virtual space (information of three-dimensional coordinates showing a shape of an object, information of three-dimensional coordinates showing a position at which the object is located, and the like). Furthermore, the information stored in the memory 22 can be various game information as the game is progressing (a player's score, information regarding a player's character (HP (Hit Point), MP (Magic Point)), and the like).

The display portion 23 is a liquid crystal display. The display portion 23 can be an organic EL (Electro-Luminescence) display or the like. The display portion 23 displays an image according to the image data supplied by the processor 24. The image data is still image data or moving image data. The image to be displayed is a still image or a moving image. The display portion 23 can display a video according to video data supplied from the processor 24.

The processor 24 can be configured as circuitry including (i) one or a plurality of processors that operates according to a computer program (software), (ii) one or a plurality of dedicated hardware circuits that executes at least part of the processing among various processing, or (iii) a combination thereof. The processor includes (i) an arithmetic processing unit, for example, a CPU (Central Processing Unit), a MPU (Micro Processing Unit), a GPU (Graphics Processing Unit), or the like and (ii) a recording medium, for example, a RAM, a ROM, or the like. Furthermore, the game processing device 2 is provided with a recording medium (memory) that is storage of a HDD (Hard Disk Drive), a SSD (Solid State Drive), or the like. At least one of these recording media stores a program code or an instruction that is configured to cause the CPU to execute processing. The recording medium, that is, a computer-readable medium, includes any available medium that can be accessed on a multipurpose or dedicated computer.

The processor 24 is provided with a game progression controller 241, a determination portion 242, an identification portion 243, an object controller 244, a parameter controller 245, and a display processor 246. Each of these portions is a functional module that is realized by a program executed by a processor provided in the processor 24. Alternatively, each of these portions can be installed in the game processing device 2 as firmware. Additionally, the processor 24 can be provided with one or a plurality of processors and peripheral circuits thereof. In this case, the processor 24 collectively controls overall operations of the game processing device 2 and is, for example, a CPU. Based on the program stored in the memory 22, operation information from the first operation device 3 and the second operation device 4, and the like, the processor 24 executes various information processing in an appropriate procedure and controls operations of the display portion 23. The processor 24 executes various information processing, based on the operating system program, the driver program, and application program that are stored in the memory 22. The processor 24 can execute a plurality of programs in parallel.

Figure 4:
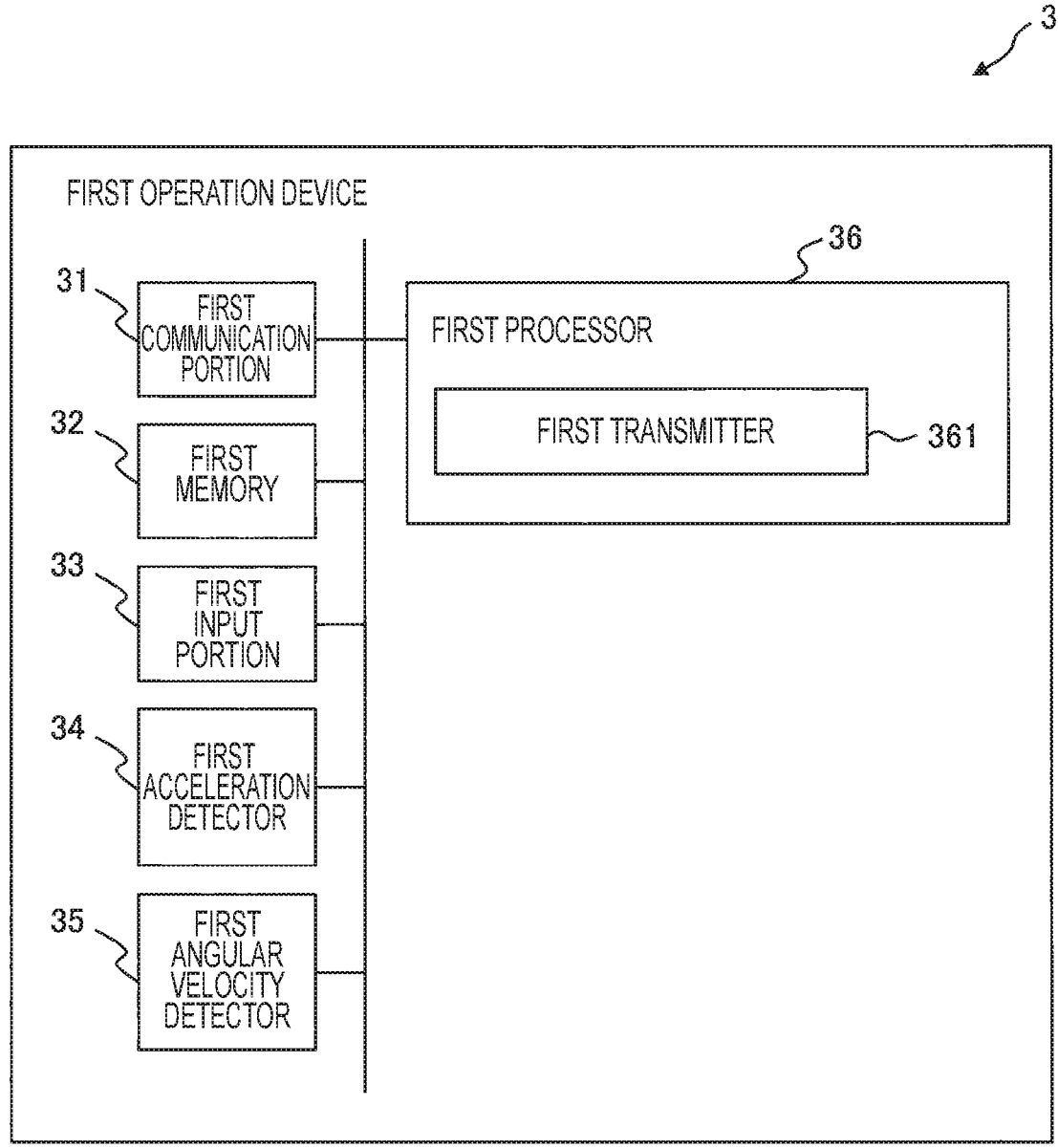
FIG. 4 is a diagram showing an example of a schematic configuration of a first operation device.

FIG. 4 is a diagram showing an example of a schematic configuration of the first operation device 3. The first operation device 3 has a function that outputs to the game processing device 2 the operation information based on the movement of the player. Because of this, the first operation device 3 is provided with a first communication portion 31, a first memory 32, a first input portion 33, a first acceleration detector 34, a first angular velocity detector 35, and a first processor 36.

Hereinafter, with reference to FIG. 4, the first communication portion 31, the first memory 32, the first input portion 33, the first acceleration detector 34, the first angular velocity detector 35, and the first processor 36 of the first operation device 3 will be explained.

The first communication portion 31 has an interface circuit for performing short-range wireless communication in accordance with a communication method such as Bluetooth (registered trademark), establishes terminal-to-terminal wireless communication with the game processing device 2, and performs direct wireless communication. Additionally, the interface circuit included in the communication portion 31 is not limited to one for performing short-range wireless communication. For example, the first communication portion 31 can have a receiver circuit for transmitting various signals by infrared communication or the like. The communication portion 31 demodulates a signal obtained from the first processor 36 into a specified radio wave and broadcasts it.

The first memory 32 is provided with a semiconductor memory device or the like such as a ROM, a RAM, and the like. The first memory 32 stores a program, data, a parameter, and the like used for processing at the first processor 36. The program stored in the first memory 32 is a communication device driver program or the like that controls the first communication portion 31. The data stored in the first memory 32 is operation device identification information or the like for identifying the first operation device 3.

The first input portion 33 is a key, a button, or the like that can be pressed by the player. The first input portion 33 has, for example, a force sensor. Furthermore, when the player performs an operation of pressing the first input portion 33 in a specified direction, the force sensor detects a pressing force generated when the player presses the first input portion 33. Every time a pressing force is detected by the force sensor, the first input portion 33 outputs to the first processor 36 input portion operation information corresponding to the first input portion 33 at which the pressing force has been detected.

The first acceleration detector 34 is an accelerometer and, at specified time intervals, detects acceleration that is applied to the first operation device 3 in each of three axial directions. An accelerometer is, for example, a piezoresistive three-axes accelerometer using a piezoresistance effect, a capacitive three-axes acceleration sensor using a change in capacitance, or the like. The first acceleration detector 34 outputs, at specified time intervals (for example, at intervals of 1/100 second), to the first processor 36 acceleration information showing detected acceleration.

Figure 6A:
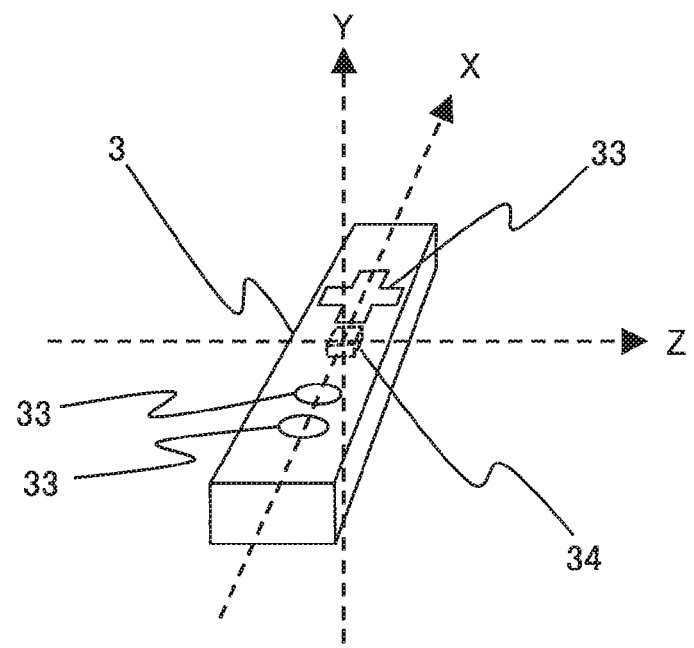
FIG. 6A is a schematic diagram for explaining an example of a detection direction of acceleration in a first acceleration detector.

FIG. 6A is a schematic diagram for explaining an example of a detection direction of acceleration at the first acceleration detector 34. In the example shown in FIG. 6A, the first acceleration detector 34 detects accelerations in an X-axis direction, a Y-axis direction, and a Z-axis direction, respectively. The X-axis direction is a specified direction (for example, a longitudinal direction when the first operation device 3 is rod-shaped, and the like) of the first operation device 3. The Y-axis direction is a direction perpendicular to both (i) a specific plane on which part or all of the first input portion 33 is arranged at the first operation device 3 and (ii) the X-axis direction. The Z-axis direction is a direction perpendicular to both the X-axis direction and the Y-axis direction. Furthermore, the axis on which the first acceleration detector 34 detects the acceleration can also be one axis, two axes, or four or more axes. Hereinafter, a three-dimensional coordinate system based on the X, Y, and Z axes may be referred to as a sensor coordinate system.

Returning to FIG. 4, the first angular velocity detector 35 is a gyro sensor and detects, at specified time intervals, an angular velocity (rotation angle per unit time) at which the first operation device 3 is rotated. The angular velocity detected by the first angular velocity detector 35 is, for example, an angular velocity about each of the three axes. The gyro sensor is a vibrating gyro sensor using a MEMS (Micro Electro Mechanical System), or the like. The first angular velocity detector 35 outputs, at specified time intervals (for example, at intervals of 1/100 second), to the first processor 36 angular velocity information showing the detected angular velocity.

Figure 6B:
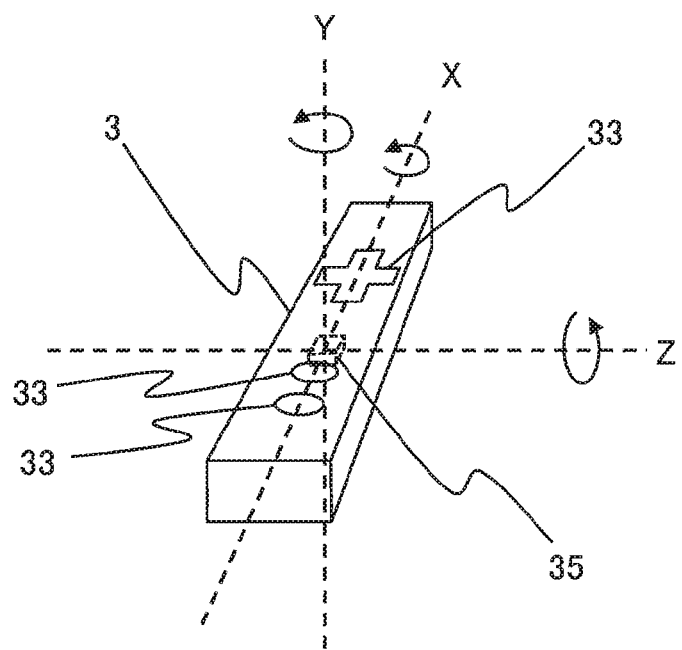
FIG. 6B is a schematic diagram for explaining an example of axes of angular velocity detected by a first angular velocity detector.

FIG. 6B is a schematic diagram for explaining an example of an axis of an angular velocity detected by the first angular velocity detector 35. In the example shown in FIG. 6B, the first angular velocity detector 35 detects an angular velocity about each of the X, Y, and Z axes. The X, Y, and Z axes pass through a specified position of the first angular velocity detector 35 and are parallel to the X, Y, and Z axes of the sensor coordinate system of the first angular velocity detector 35. Furthermore, the axis of the angular velocity detected by the first angular velocity detector 35 can also be one axis, two axes, or four or more axes.

Returning to FIG. 4, the first processor 36 has one or a plurality of processors and peripheral circuits thereof. The first processor 36 collectively controls overall operations of the first operation device 3 and is, for example, a CPU. The first processor 36 controls operations of a first transmitter 361 and the like such that various processing of the first operation device 3 is executed in an appropriate procedure according to the program and the like stored in the first memory 32. The first transmitter 361 is a functional module that is realized by a program executed by a processor provided in the first processor 36. Alternatively, the first processor 36 can be installed in the first operation device 3 as firmware.

Figure 5:
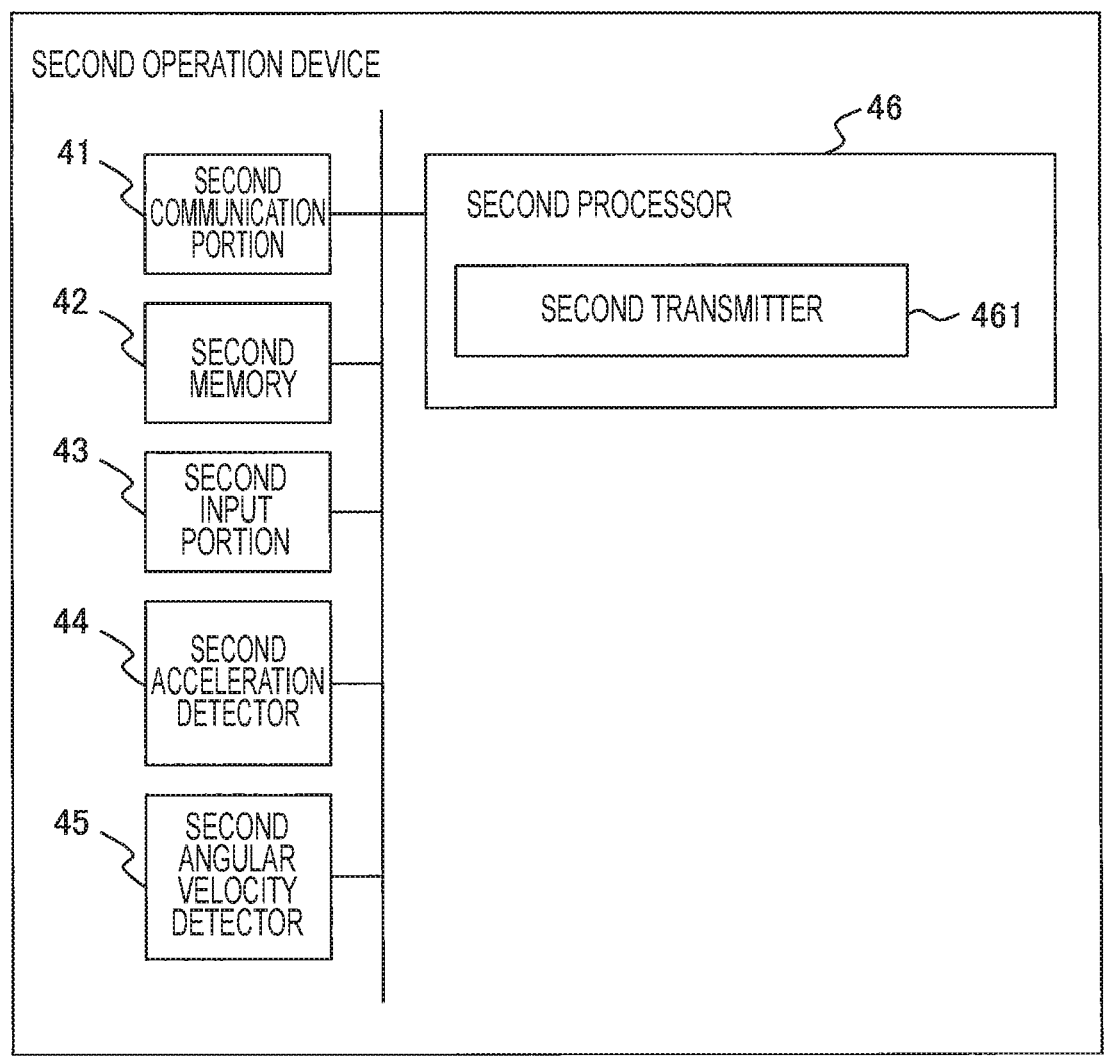
FIG. 5 is a diagram showing an example of a schematic configuration of a second operation device.

FIG. 5 is a diagram showing an example of a schematic configuration of the second operation device 4. In the same manner as in the first operation device 3, the second operation device 4 has a function that outputs to the game processing device 2 operation information based on the movement of the player. Because of this, the second operation device 4 is provided with a second communication portion 41, a second memory 42, a second input portion 43, a second acceleration detector 44, a second angular velocity detector 45, and a second processor 46.

The second communication portion 41 has a similar configuration to the first communication portion 31. The second communication portion 41 modulates a signal obtained from the second processor 46 into a specified radio wave and broadcasts it.

The second memory 42 has a similar configuration to the first memory 32. The second memory 42 stores a program, data, a parameter, and the like used for processing at the second processor 46. The program stored in the second memory 42 is a communication device driver program or the like that controls the second communication portion 41. The data stored in the second memory 42 is operation device identification information or the like for identifying the second operation device 4.

The second input portion 43 has a similar configuration to the first input portion 33. Every time a pressing force is detected by the force sensor, the second input portion 43 outputs to the second processor 46 input portion operation information corresponding to the second input portion 43 at which the pressing force has been detected.

The second acceleration detector 44 has a similar configuration to the first acceleration detector 34 and detects acceleration that is applied to the second operation device 4 at specified time intervals in each of three axial directions. Furthermore, the axis on which the second acceleration detector 44 detects the acceleration can also be one axis, two axes, or four or more axes. The second acceleration detector 44 outputs to the second processor 46 acceleration information showing the detected acceleration.

The second angular velocity detector 45 has a similar configuration to the first angular velocity detector 35 and detects, at specified time intervals, an angular velocity (rotation angle per unit time) at which the second operation device 4 is rotated. Furthermore, the axis of the angular velocity detected by the second angular velocity detector 45 can be also one axis, two axes, or four or more axes. The second angular velocity detector 45 outputs to the second processor 46 angular velocity information showing the detected angular velocity.

The second processor 46 collectively controls overall operations of the second operation device 4 and has a similar configuration to the first processor 36. The second processor 46 controls operations of a second transmitter 461 and the like such that various processing of the second operation device 4 is executed in an appropriate procedure according to the program and the like stored in the second memory 42. The second transmitter 461 is a functional module that is realized by a program executed by a processor provided by the second processor 46. Alternatively, the second processor 46 can be installed in the second operation device 4 as firmware.

FIG. 7 is a diagram showing an example of a data structure of operation information output by the first and second operation devices. The operation information is output at specified time intervals (for example, at intervals of 1/100 second).

The operation information includes various information output by (i) the first input portion 33, the first acceleration detector 34, and the first angular velocity detector 35, or (ii) the second input portion 43, the second acceleration detector 44, and the second angular velocity detector 45 according to the player's movements. The operation information shown in FIG. 7 includes operation device identification information, X-axis direction acceleration information, Y-axis direction acceleration information, Z-axis direction acceleration information, X-axis angular velocity information, Y-axis angular velocity information, Z-axis angular velocity information, and input portion operation information.

The operation device identification information is (i) identification information for identifying the first operation device 3 or (ii) identification information for identifying the second operation device 4. The identification information for identifying the first operation device 3 is stored in the first memory 32, and the identification information for identifying the second operation device 4 is stored in the second memory 42.

The X-axis direction acceleration information is (i) acceleration information showing acceleration in the X-axis direction detected by the first acceleration detector 34 or (ii) acceleration information showing acceleration in the X-axis direction detected by the second acceleration detector 44.

The Y-axis direction acceleration information is (i) acceleration information showing acceleration in the Y-axis direction detected by the first acceleration detector 34 or (ii) acceleration information showing acceleration in the Y-axis direction detected by the second acceleration detector 44.

The Z-axis direction acceleration information is (i) acceleration information showing acceleration in the Z-axis direction detected by the first acceleration detector 34 or (ii) acceleration information showing acceleration in the Z-axis direction detected by the second acceleration detector 44.

The X-axis angular velocity information is (i) angular velocity information showing an angular velocity about the X axis detected by the first angular velocity detector 35 or (ii) angular velocity information showing an angular velocity about the X axis detected by the second angular velocity detector 45.

The Y-axis angular velocity information is (i) angular velocity information showing an angular velocity about the Y axis detected by the first angular velocity detector 35 or (ii) angular velocity information showing an angular velocity about the Y axis detected by the second angular velocity detector 45.

The Z-axis angular velocity information is (i) angular velocity information showing an angular velocity about the Z axis detected by the first angular velocity detector 35 or (ii) angular velocity information showing an angular velocity about the Z axis detected by the second angular velocity detector 45.

The input portion operation information is information that is only included when the input portion operation information is output from the first input portion 33 or the second input portion 43. For example, if the first input portion 33 is pressed for one second by the player, in the operation information that has been output during this one second, the input portion operation information is included that has been output from the first input portion 33. Additionally, if the operation information is output at intervals of 1/100 second, in each piece of all operation information that has been output during the one second in which the first input portion 33 has been pressed by the player, the input portion operation information output from the first input portion 33 is included.

Figure 8A:
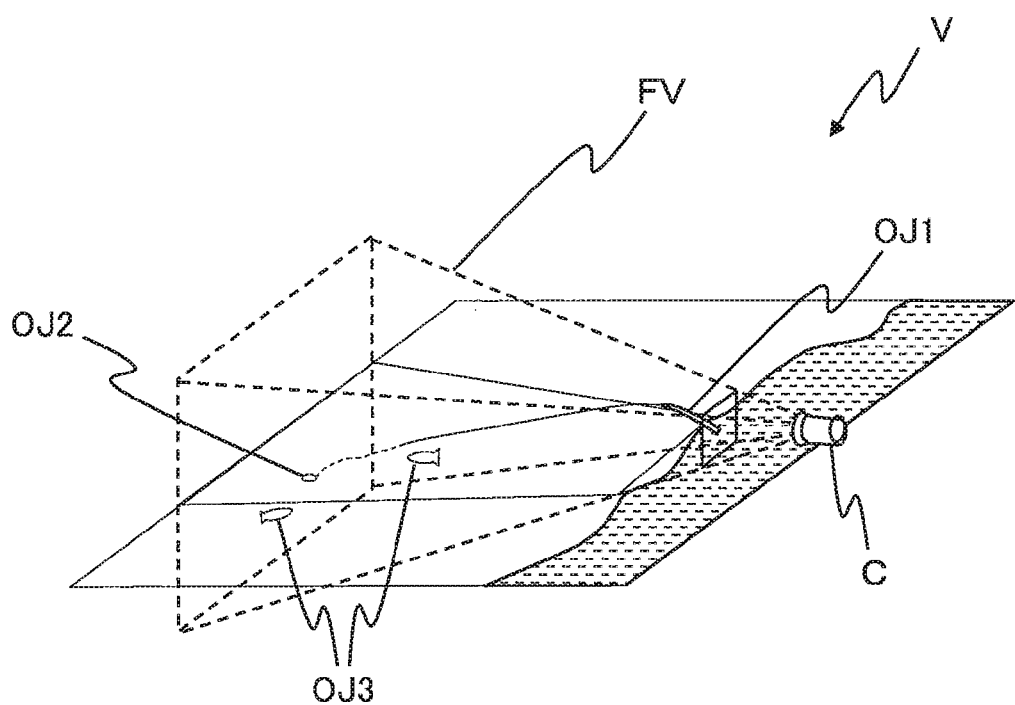
FIG. 8A is a schematic diagram showing an example of a virtual space.

FIG. 8A is a schematic diagram showing an example of a virtual space V created by the game processing device 2.

In the virtual space V, (i) the first object OJ1 imitating a fishing rod, (ii) a second object OJ2 imitating a lure, bait, or the like connected to the fishing rod through a fishing line and (iii) third objects OJ3 imitating fish are included. Additionally, in the virtual space V, (i) an object imitating a fishing line, (ii) an object imitating seawater, lake water, rivers, or the like, (iii) an object imitating land, an island, or the like may be included. Furthermore, the first object OJ1 can be any object that is operated by the object operation device. Additionally, the second object OJ2 can be any object that is related to the first object. In addition, each of the third objects OJ3 is an object that moves along (i) an automatically predetermined route or (ii) a randomly determined route. Additionally, the third objects OJ3 can be any objects that are located at specific points without moving.

A virtual camera C is arranged at a specified location in the vicinity of the first object OJ1. A line-of-sight direction of the virtual camera C is controlled such that at least part of the first object OJ1, the second object OJ2, and the third object OJ3 respectively are included in a field of view FV of the virtual camera C.

Figure 8B:
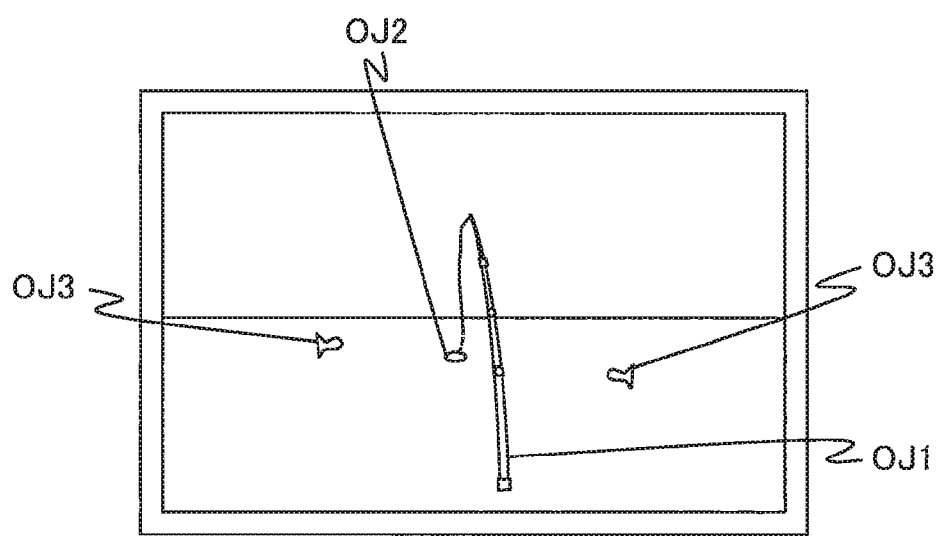
FIG. 8B is a diagram showing an example of an image displayed on a display portion of the game processing device.

FIG. 8B is a diagram showing an example of an image shown on the display portion 23 of the game processing device 2.

The image shown in FIG. 8B is an image that (i) is projected on a specified two-dimensional screen plane arranged in the line-of-sight direction of the virtual camera C and (ii) shows the virtual space V in the field of view FV. In the example shown in FIG. 8B, an image including the first object OJ1, the second object OJ2, and the third objects OJ3 is displayed.

Figure 9A:
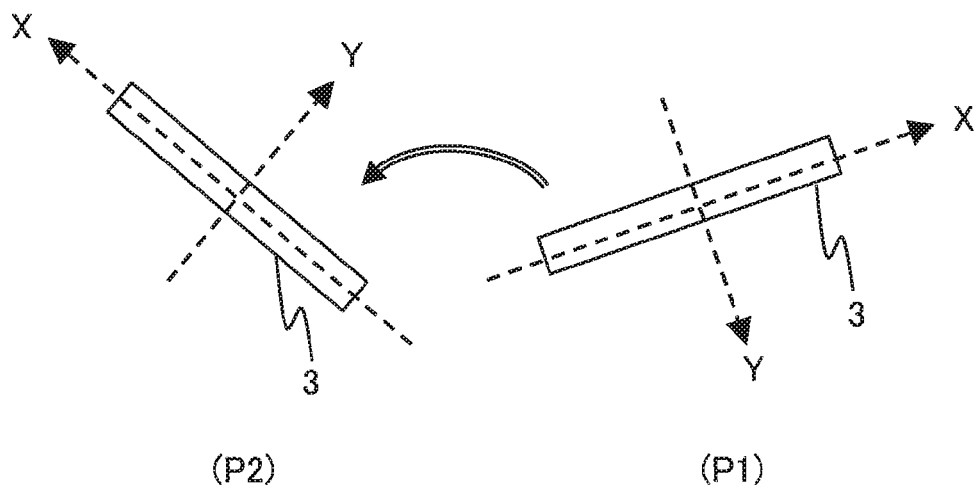
FIG. 9A is a schematic diagram for explaining an example of movement of the operation device.

FIG. 9A is a schematic diagram for explaining an example of movements of the operation devices.

The movements of the operation devices shown in FIG. 9A are movements of the operation devices when the player grasps one of the first operation device 3 and the second operation device 4 as a fishing rod and performs a casting action (overthrowing).

With reference to FIG. 9A, a case in which the operation device grasped by the player to perform a casting action is the first operation device 3 will be described as an example. When the player grasps the first operation device 3 and performs a casting action, for example, the first operation device 3 moves from a first position P1 to a second position P2 while being rotated in a rotation direction about the Z axis.

Acceleration information output by the first acceleration detector 34 while the first operation device 3 travels from the first position P1 to the second position P2 is (i) the X-axis direction acceleration information, (ii) the Y-axis direction acceleration information, and (iii) the Z-axis direction acceleration information that show acceleration obtained by combining (a) gravitational acceleration and (b) acceleration in the travel direction. Angular velocity information output by the first angular velocity detector 35 of the first operation device 3 while the first operation device 3 is traveling from the first position P1 to the second position P2 is (i) the X-axis angular velocity information, (ii) the Y-axis angular velocity information, and (iii) the Z-axis angular velocity information that are related to the rotation from the first position P1 to the second position P2.

The first transmitter 361 of the first operation device 3 obtains, at specified time intervals, acceleration information and angular velocity information output from the first acceleration detector 34 and the first angular velocity detector 35. Additionally, the first transmitter 361 transmits, at specified time intervals, to the game processing device 2 via the first transmitter 361 operation information including the obtained acceleration information and angular velocity information. Additionally, the first transmitter 361 is an example of the output portion.

Furthermore, if the operation device grasped by the player to perform a casting action is the second operation device 4, in the same manner as in the first transmitter 361, the second transmitter 461 of the second operation device 4 obtains, at specified time intervals, the acceleration information and the angular velocity information output from the second acceleration detector 44 and the second angular velocity detector 45. Then, the second transmitter 461 transmits, at specified time intervals, to the game processing device 2 via the second communication portion 41 the operation information including the obtained acceleration information and angular velocity information. The second transmitter 461 is an example of an output portion.

Figure 9B:
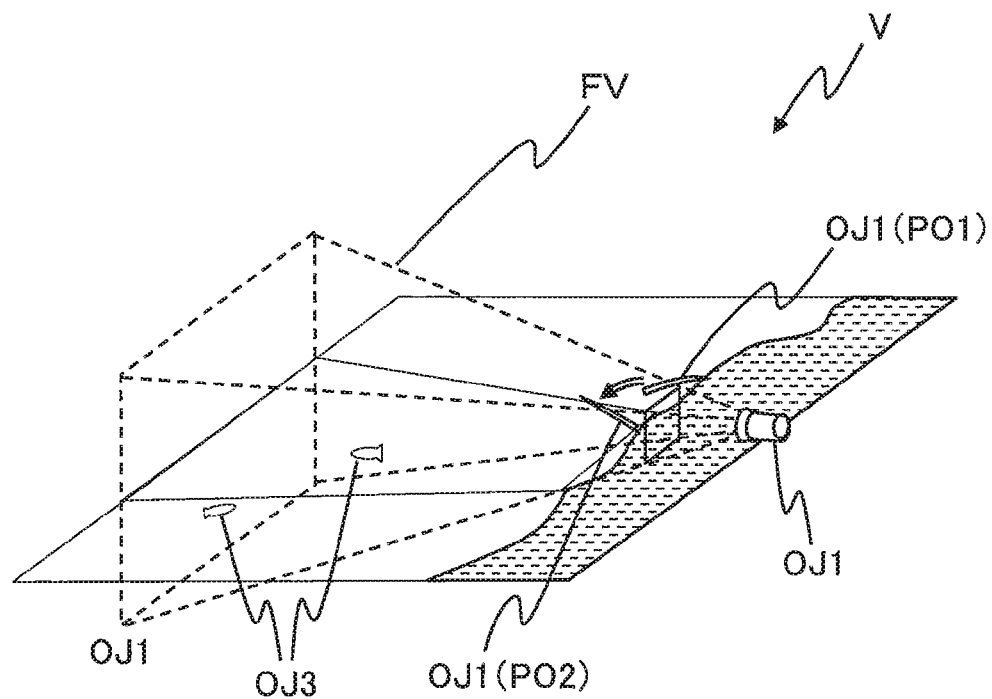
FIG. 9B is a schematic diagram showing an example of a virtual space.

FIG. 9B is a schematic diagram showing an example of the virtual space V created by the game processing device 2.

The first object OJ1 included in the virtual space V changes based on the operation information that is output when the player grasps one of the first operation device 3 and the second operation device 4 as a fishing rod and performs a casting action (overthrowing) as shown in FIG. 9A.

Every time the game processing device 2 receives the operation information that has been transmitted at specified time intervals from the first operation device 3 and the second operation device 4, it determines whether the received operation information satisfies a first operation information condition. If the game processing device 2 determines that the received operation information satisfies the first operation information condition, it identifies the operation device that has transmitted the operation information as an object operation device. The first operation information condition is a condition or the like in which, for example, when the X-axis direction acceleration information, the Y-axis direction acceleration information, and the Z-axis direction acceleration information are output as the operation information, resultant acceleration, combining (i) acceleration in the X-axis direction shown by the X-axis direction acceleration information, (ii) acceleration in the Y-axis direction shown by the Y-axis direction acceleration information, and (iii) acceleration in the Z-axis direction shown by the Z-axis direction acceleration information, exceeds a specified numerical value. Furthermore, the first operation information condition may also be that, when the acceleration information of one or a plurality of axes is output as operation information, the acceleration indicated by the acceleration information of any axis exceeds a specified numerical value.

The first object OJ1 included in the virtual space V changes based on the operation information from the object operation device. For example, if it is determined that the operation information from the object operation device satisfies the first operation information condition, the first object OJ1 travels from a predetermined first object position PO1 to a second object position PO2. Furthermore, information of the three-dimensional coordinates showing the first object position PO1 is stored in the memory 22 of the game processing device 2 as information related to the first object.

The second object position PO2 is a predetermined position, or a position based on the operation information from the object operation device. If the second object position PO2 is a predetermined position, the information of the three-dimensional coordinates showing the second object position PO2 is stored in the memory 22 of the game processing device 2 as information related to the first object.

If the second object position PO2 is a position based on the operation information from the object operation device, for example, the second object position PO2 is calculated based on the acceleration information included in the operation information.

For example, based on part or all of the acceleration information in a target period from the time when the acceleration shown by the acceleration information included in the operation information exceeds a specified numerical value to the time when the acceleration falls below the specified value, a travel distance of the object operation device that has moved within the target period is calculated. The acceleration shown by the acceleration information included in the operation information is, for example, resultant acceleration combining (i) the acceleration shown by the X-axis direction acceleration information, (ii) the acceleration shown by the Y-axis direction acceleration information, and (iii) the acceleration shown by the Z-axis direction acceleration information.

Next, based on a correspondence table (the correspondence table is stored, for example, in the memory 22 of the game processing device 2) or the like of (i) a travel distance of the object operation distance and (ii) a first travel distance of the first object OJ1, the first travel distance of the first object OJ1 within the virtual space V corresponding to the travel distance of the calculated object operation device is calculated. Additionally, the second object position PO2 is calculated based on the first object position PO1 and the first travel distance. Additionally, the second object position PO2 may also be calculated based on the angular velocity information included in the operation information. For example, based on part or all of the acceleration information or the angular velocity information in the target period, a vector from the first position P1 of the object operation device to the position of the object operation device corresponding to each piece of operation information is calculated at specified time intervals. Next, three-dimensional coordinates are calculated showing the position of the first object OJ1 corresponding to the calculated vector. Furthermore, the first object OJ1 travels, based on the three-dimensional coordinates, while it is being rotated based on the angular velocity information.

Figure 10A:
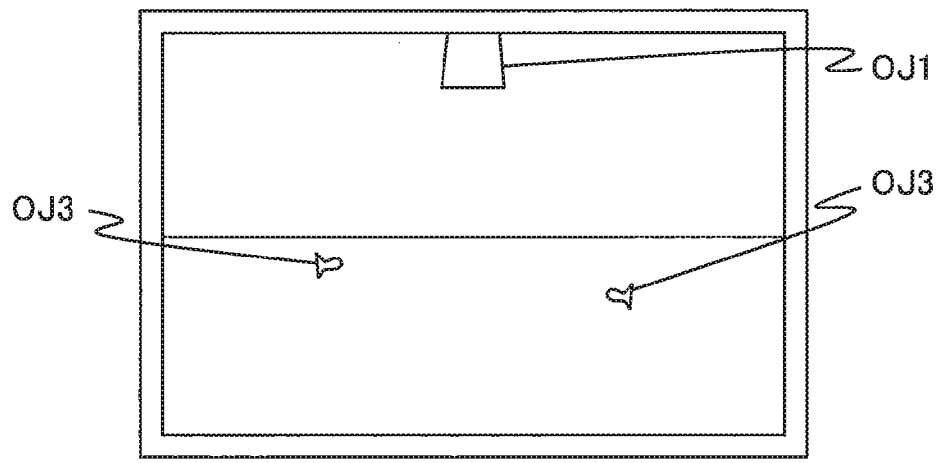
FIG. 10A is a diagram showing an example of an image displayed on a display portion of the game processing device.
Figure 10B:
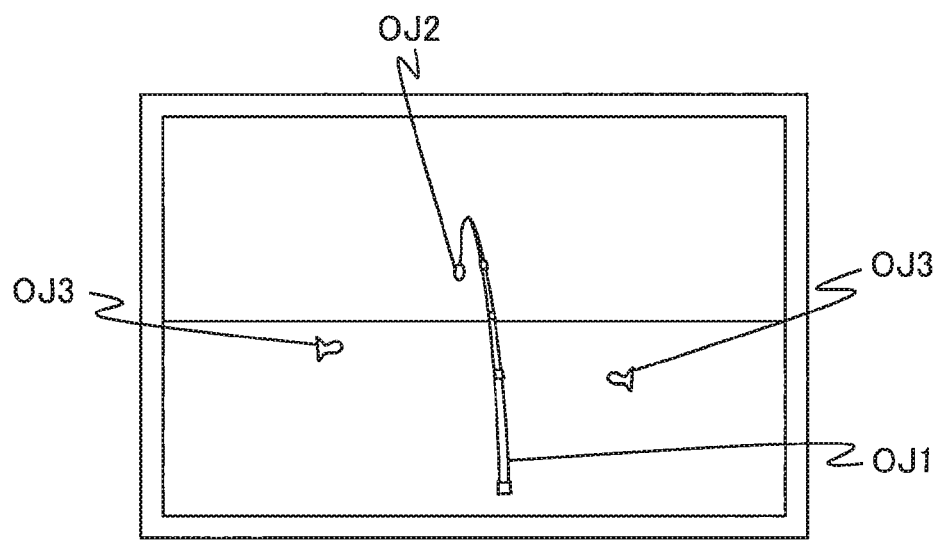
FIG. 10B is a diagram showing an example of an image displayed on a display portion of the game processing device.

FIGS. 10A and 10B are diagrams showing examples of images shown on the display portion 23 of the game processing device 2.

FIG. 10A is an image that is projected on a specified two-dimensional screen plane arranged in the line-of-sight direction of the virtual camera C and shows the virtual space V within the field of view FV when the first object OJ1 is located at the first object position PO1.

FIG. 10B is an image that is projected on a specified two-dimensional screen plane arranged in the line-of-sight direction of the virtual camera C and shows the virtual space V within the field of view FV when the first object OJ1 is located at the second object position PO2.

When the first object 0J1 reaches the second object position PO2, the second object OJ2 starts to travel from a specified location (for example, when the first object imitates a fishing rod, a top guide of the rod, or the like) of the first object OJ1. Furthermore, while the first object OJ1 is traveling from the first object position PO1 to the second object position PO2, the second object OJ2 may also start to travel from a specified location of the first object OJ1. A travel start position of the second object OJ2 is not limited to the specified location of the first object OJ1 and may be a position within a specified range from the first object OJ1.

In the example shown in FIG. 10B, an image is displayed which includes the second object OJ2 that is traveling. A second travel distance and a travel route of the second object OJ2 are calculated based on the operation information, and the second object OJ2 travels along the travel route from the travel start position to an arrival position PO3 separated by the second travel distance.

The second travel distance of the second object OJ2 is, for example, calculated based on the acceleration information included in the operation information. Hereinafter, processing will be explained in which, based on the acceleration information included in the operation information, the second travel distance of the second object OJ2 is calculated. First, based on part or all of the acceleration information in the target period, the travel velocity of the second object OJ2 at the time at which the second object starts traveling is calculated. Then the second travel distance corresponding to the calculated travel velocity is calculated. Furthermore, the travel velocity used for calculating the second travel distance may also be an average travel velocity during the period from the time at which the second object starts traveling to a time before the specified time. Additionally, as the travel route of the second object OJ2, a specified curve (for example, a second-order curve, or the like) is calculated that connects from the location at which the second object starts traveling to the arrival position PO3.

Furthermore, the second travel distance of the second object OJ2 may also be calculated based on a travel angle of the direction of the acceleration shown by the acceleration information included in the operation information. The acceleration shown by the acceleration information included in the operation information is, for example, resultant acceleration combining (i) the acceleration shown by the X-axis direction acceleration information, (ii) the acceleration shown by the Y-axis direction acceleration information, and (iii) the acceleration shown by the Z-axis direction acceleration information. In this case, for each piece of the operation information, the direction of the acceleration, in the sensor coordinate system, shown by the acceleration information included in each piece of the operation information is calculated. Then, as a travel angle, an angle between (i) the direction of the acceleration immediately after the first object OJ1 starts traveling and (ii) the direction of the acceleration of the first object when the second object OJ2 starts traveling is calculated. Furthermore, the second travel distance of the second object OJ2 may also be calculated based on the angular velocity information included in the operation information. For example, based on a correspondence table (the correspondence table is stored, for example, in the memory 22 of the game processing device 2) between (i) an integrated value calculated by integrating the angular velocity information and (ii) the second travel distance, the second travel distance is calculated based on the integrated value calculated by integrating all or part of the angular velocity information in the target period.

An angle (elevation angle) A of the travel direction of the second object OJ2 from a horizontal plane in the virtual space V is calculated such that the larger the travel angle becomes, the smaller the angle A becomes, and the smaller the travel angle becomes, the larger the angle A becomes.

Figure 11:
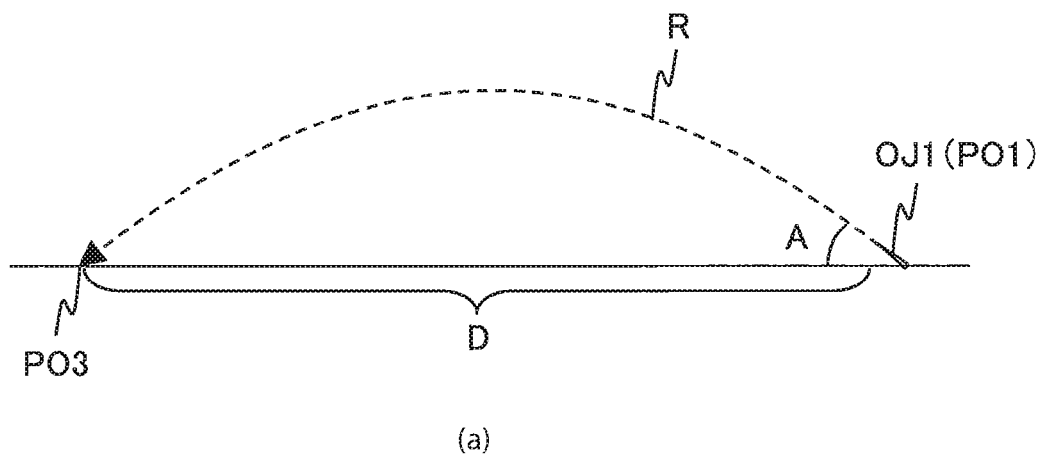
FIG. 11 is a schematic diagram showing an example of a travel route of a second object in a virtual space.
Figure 11:
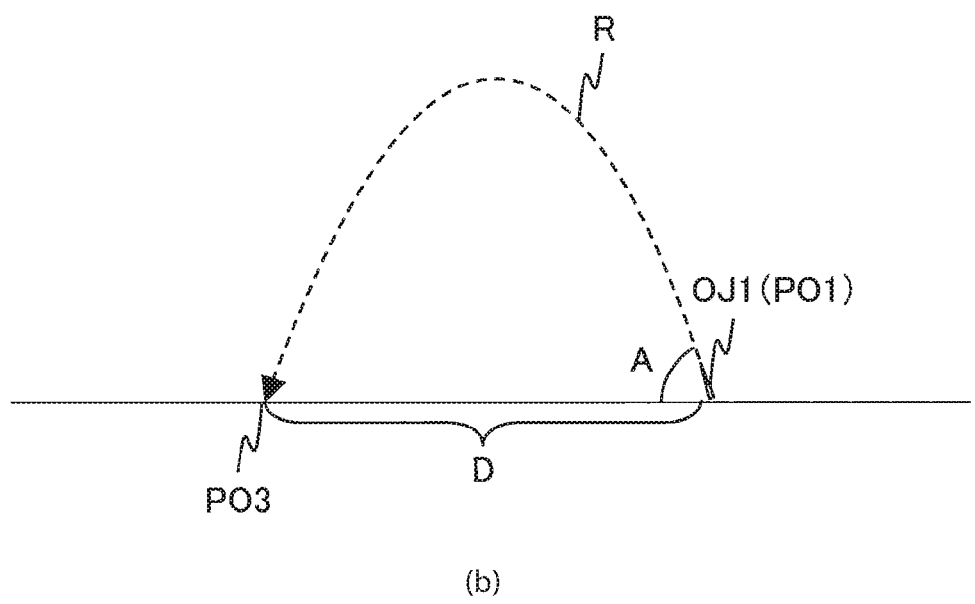

FIG. 11 is a schematic diagram showing an example of the travel route of the second object OJ2 in the virtual space V. A travel route R and a travel distance D of the second object OJ2 are calculated, based on (i) the travel velocity of the second object OJ2 and the calculated angle A at the time the second object starts traveling and (ii) a function showing a specified curve (for example, a second-order curve or the like).

The angle (elevation angle) A of the travel direction of the second object OJ2 from the horizontal plane in the virtual space V may also be calculated based on the acceleration information and the angular velocity information included in the operation information. Hereinafter, an example of a process in which the angle A is calculated based on the acceleration information and the angular velocity information included in the operation information will be explained. First, when a time during which the acceleration shown by the acceleration information included in the operation information is substantially the same as the gravitational acceleration has continued for a specified gravity determination time or more, it is determined that the direction of the acceleration shown by the acceleration information is vertically downward. Next, the direction of the acceleration determined to be vertically downward is set as a reference direction in the sensor coordinate system. Next, based on the angular velocity information included in the operation information, a first difference angle between (i) the direction of the acceleration immediately after the first object OJ1 starts traveling and (ii) the reference direction is calculated. Then, based on the angular velocity information included in the operation information, a second difference angle between (i) the direction of the acceleration of the first object at the time the second object OJ2 starts traveling and (ii) the reference direction is calculated. The difference between the first difference angle and the second difference angle is calculated as angle A.

Figure 12A:
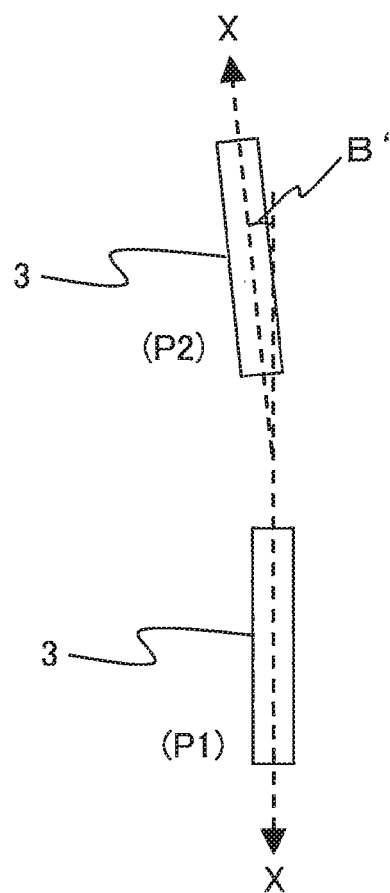
FIG. 12A is a schematic diagram for explaining an example of movement of the operation device.

Furthermore, in the travel direction of the second object OJ2, the direction when the second object OJ2 is projected on the horizontal plane in the virtual space V may also be calculated based on the operation information. FIG. 12A is a schematic diagram for explaining an example of a movement of the object operation device.

For example, a difference angle B between (i) a line segment in which the X axis of the object operation device at the first position P1 is projected on the horizontal plane and (ii) a line segment in which the X axis of the object operation device at the second position P2 is projected on the horizontal plane is calculated based on the angular velocity information and the acceleration information included in the operation information.

Hereinafter, an example of a process in which the difference angle B is calculated based on the angular velocity information and the acceleration information included in the operation information will be explained. First, based on the acceleration information, a vertically downward direction is determined, and a plane perpendicular to the vertically downward direction is determined as a horizontal plane. Next, a line segment is determined in which the X axis of the object operation device at the first position P1 is projected on the horizontal plane. Then, based on the angular velocity information included in the operation information, the difference angle B between (i) the line segment in which the X axis of the object operation device at the second position P2 is projected on the horizontal plane and (ii) the line segment in which the X axis of the object operation device at the first position P1 is projected on the horizontal plane is calculated.

Figure 12B:
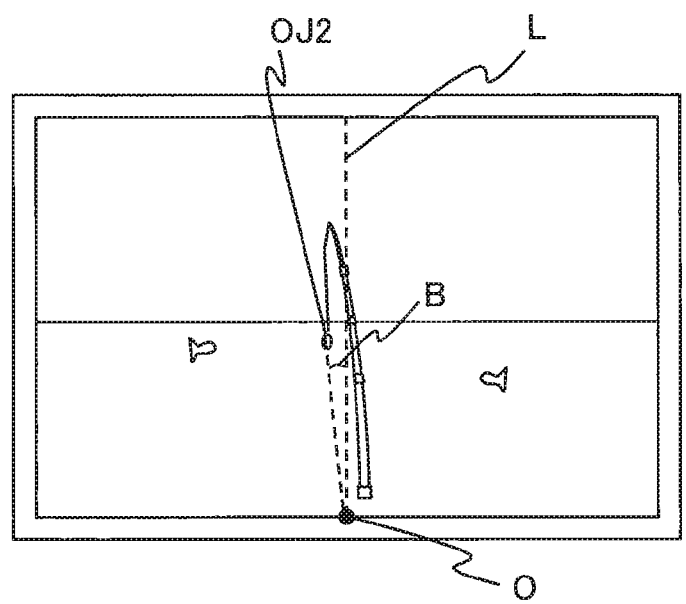
FIG. 12B is a diagram showing an example of an image displayed on the display portion of the game processing device.

FIG. 12B is an image showing the virtual space V in the field of view FV which is projected on a specified two-dimensional screen plane arranged in the line-of-sight direction of the virtual camera C when the second object OJ2 travels.

In the example shown in FIG. 12B, the direction projected on the horizontal plane in the virtual space V, in the travel direction of the second object OJ2, is set at the difference angle B. For example, using a lower center point O of the display screen of the display portion 23 as a center, the second object OJ2 travels according to the direction rotated by the difference angle B from a reference direction L extending upward from the lower center point O (both the lower center point O and the reference direction L are not displayed).

If the position of the second object that moves according to the travel direction is out of a movable range, the position of the second object OJ2 may be corrected to be within the movable range. For example, the movable range is a range within the field of view FV of the virtual camera C.

Figure 13:
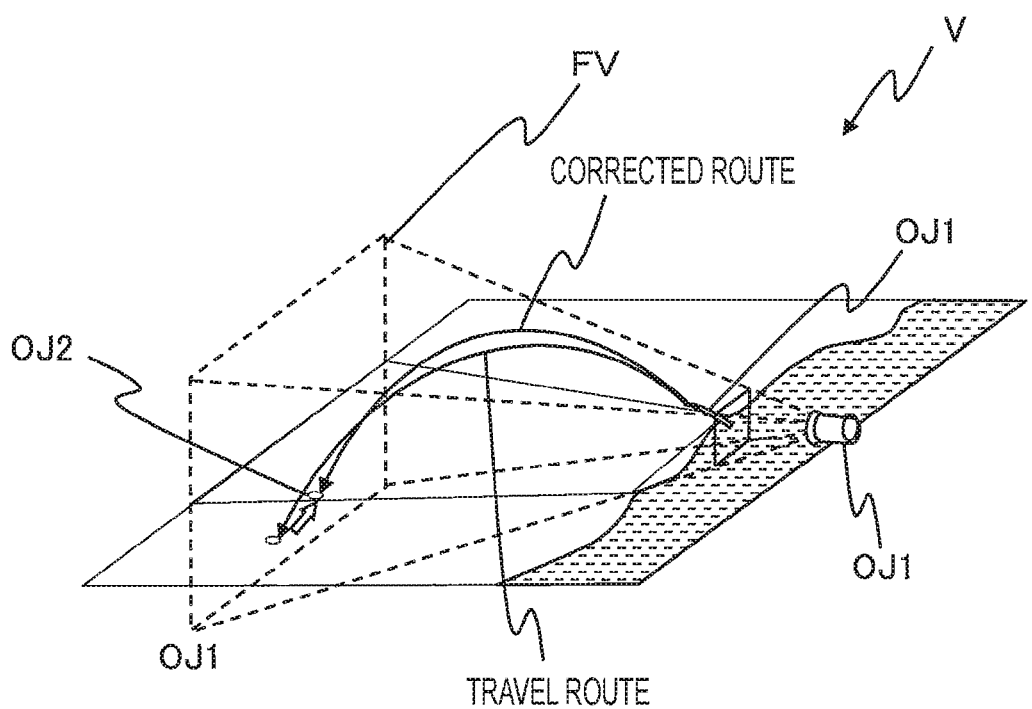
FIG. 13 is a schematic diagram showing an example of a virtual space.

FIG. 13 is a schematic diagram for explaining an example of a process in which the position of the second object OJ2 is corrected in the virtual space V created by the game processing device 2.

For example, if the calculated travel route is out of the movable range (within the field of view FV of the virtual camera C), the arrival position PO3 moves to be within the movable range, and a corrected route is re-calculated that connects the travel start position to the arrival position PO3 after the travel. In the recalculation process of the corrected route, for example, the corrected route is calculated using the angle A of the travel route to be corrected.

By suppressing the second object OJ2 from disappearing from the screen during the game, the game can be continually played without having the player perform an operation of searching for the second object OJ2 in the virtual space V. By so doing, it is possible to suppress the player from losing his immersion in the game.

When the second object OJ2 reaches the arrival position PO3, it is determined whether the second object OJ2 and the third object OJ3 satisfy a specified relationship. The specified relationship is, for example, a positional relationship in which the position of the second object OJ2 and the position of the third object OJ3 contact each other. Furthermore, the specified relationship may be another relationship. For example, it may be a positional relationship in which the position of the third object OJ3 is included in a specified range using the position of the second object OJ2 as a center. If the second object OJ2 and the third object OJ3 satisfy the specified relationship, the third object OJ3 travels in a direction toward the first object OJ1 based on operation information that is based on the player's movement.

Figure 14A:
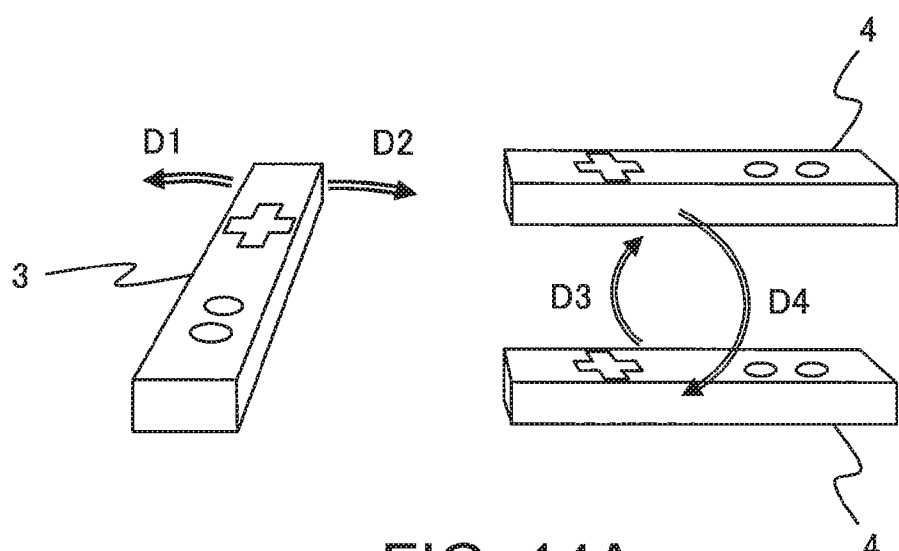
FIG. 14A is a schematic diagram for explaining an example of movement of the operation device.

FIG. 14A is a schematic diagram for explaining an example of movements of the operation devices.

In the example shown in FIG. 14A, the movements of the operation devices are the movements of the second operation device 4 when the player grasps the second operation device 4 as a reel handle and performs an operation of winding the reel. When the player grasps the first operation device 3 as an object operation device, and the first operation device 3 travels in a direction of D1, according to the operation information included in the angular velocity information detected by the first angular velocity detector, similarly the first object OJ1 also travels in the direction of D1. Additionally, when the first operation device 3 travels in a direction of D2, according to the operation information included in the angular velocity information detected by the first angular velocity detector, similarly the first object OJ1 also travels in the direction of D2.

When the player grasps the second operation device 4 and winds the reel, the second operation device 4 performs a specified motion that repeats a movement in a first direction D3 and a movement in a second direction D4.

Every time the game processing device 2 receives the operation information that has been transmitted at specified time intervals from the first operation device 3 and the second operation device 4, it determines whether the received operation information satisfies a second operation information condition. When the game processing device 2 determines that the received operation information satisfies the second operation information condition, it identifies the operation device that has transmitted the operation information as a parameter operation device.

The second operation information condition is a condition that, for example, it is determined that a periodic motion is performed in which the operation device that has transmitted the operation information repeats the movement in the first direction D3 and the movement in the second direction D4, based on the acceleration information included in the operation information. When the periodic motion is performed, in the acceleration detector of the operation device (the first acceleration detector 34 or the second acceleration detector 44), the detected acceleration direction is reversed in at least one axis of the sensor coordinate system. That is, in the acceleration detector, when a motion is detected in which the acceleration direction is repeatedly reversed, it is determined that a periodic motion is performed. Hereinafter, a case in which the periodic motion is a reciprocating motion will be described as an example.

The operation device grasped by the player to perform an operation of winding a reel may be an operation device grasped by the player as an object operation device. In the example shown in FIG. 14A, the player performs a reciprocating motion in which the second operation device 4 is repeatedly moved in the first direction D3 and the second direction D4, and when the game processing device 2 determines that the operation information that has received from the second operation device 4 satisfies the second operation information condition, it identifies the second operation device 4 that has transmitted the operation information as a parameter operation device. In this case, the first operation device 3 is identified as an object operation device.

Figure 14B:
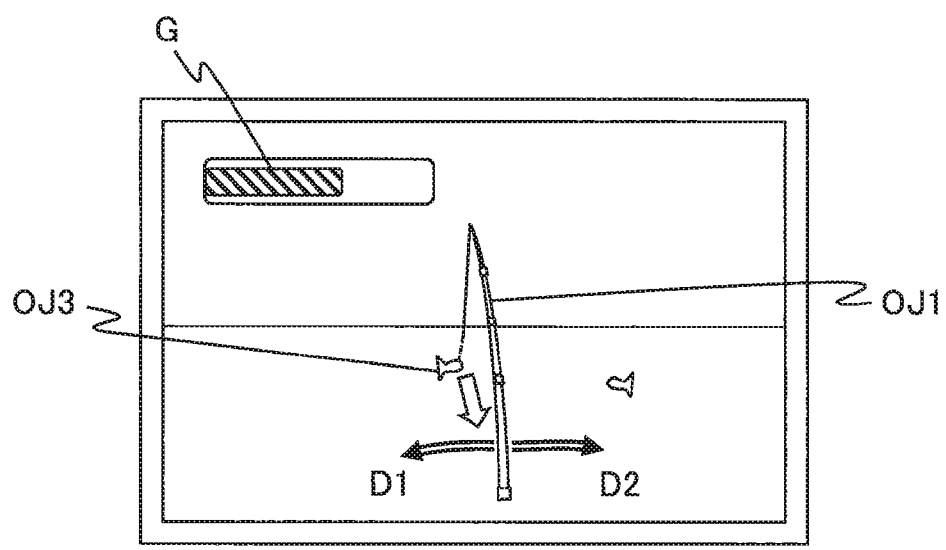
FIG. 14B is a diagram showing an example of an image displayed on the display portion of the game processing device.

FIG. 14B is a diagram showing an example of an image displayed on the display portion 23 of the game processing device 2.

This is an image that is projected on a specified two-dimensional screen plane arranged in the line-of-sight direction of the virtual camera C and shows the virtual space V in the field of view FV when one of the first operation device 3 and the second operation device 4 is identified as a parameter operation device.

In the example shown in FIG. 14B, there are displayed at least an image showing a gauge G as well as the image which shows the virtual space V including (i) the first object OJ1 and (ii) the third object OJ3 that travels according to the reciprocating motion of the parameter operation device.

A shape of the gauge G changes to a display form according to a cycle of the reciprocating motion of the parameter operation device. The cycle of the reciprocating motion of the parameter operation device is a cycle of the movement in the first direction D3 and the movement in the second direction D4.

In the example shown in FIG. 14B, the gauge G has a shape of a bar graph. Furthermore, the shape of the gauge G is not limited to the shape of the bar graph. The shape of the gauge G is set by the game processing device 2 such that the shorter the cycle of the reciprocating motion of the parameter operation device is (that is, there are many reciprocating motions per unit time), the larger the value of the parameter becomes, and the longer the cycle of the reciprocating motion of the parameter operation device is, the smaller the value of the parameter becomes. Additionally, the length of the bar graph of the gauge G changes according to the value of the parameter. For example, the larger the value of the parameter becomes, the longer the length of the bar graph becomes, and the smaller the value of the parameter becomes, the shorter the length of the bar graph becomes.

Additionally, the shape of the gauge G may also be set by the game processing device 2 such that the larger the displacement of one cycle in the reciprocating motion of the parameter operation device becomes, the larger the value of the parameter becomes. By so doing, even if the cycle of reciprocating motion is long, the player can wind a large amount of fishing line by moving the arm in a large rotation.

Furthermore, the length of the bar graph of the gauge G may change based on information regarding the value of the parameter and the progression of the game. The information regarding the progression of the game is, for example, information regarding a direction and/or a travel velocity in which the third object OJ3 automatically travels. In this case, when the third object OJ3 automatically travels in a direction other than a travel direction toward the first object OJ1, the length of the bar graph of the gauge G is a length according to a value calculated by multiplying the value of the parameter by a specified coefficient of 1 or more. Additionally, as the travel velocity at which the third object OJ3 automatically travels becomes faster, the specified coefficient may be made larger. In addition, when the third object OJ3 is traveling in a travel direction toward the first object OJ1, the length of the bar graph of the gauge G is a length according to a value calculated by multiplying the value of the parameter by a specified coefficient of less than 1.

Furthermore, the travel velocity of the third object OJ3 toward the first object OJ1 changes according to the value of the parameter. For example, the travel velocity of the third object OJ3 toward the first object OJ1 is set such that the larger the value of the parameter is, the faster the velocity is, and the smaller the value of the parameter is, the slower the velocity is. By so doing, the faster the player makes the reciprocating motion of the parameter operation device, the faster he can move the third object OJ3 toward his hand.

Hereinafter, the game progression controller 241, the determination portion 242, the identification portion 243, the object controller 244, the parameter controller 245, and the display processor 246 that are provided in the processor 24 of the game processing device 2 will each be explained.

The game progression controller 241 reads the information regarding various objects stored in the memory 22 and creates a virtual space V in which the various objects are arranged, based on the read information. The objects arranged in the virtual space V are, for example, the first object OJ1, the second object OJ2, and the third object OJ3. Furthermore, a virtual camera C is arranged in the virtual space V.

In addition, the game progression controller 241 receives, via the communication portion 21, the operation information that has been output, at specified time intervals, from the first operation device 3 and the second operation device 4.

Furthermore, the game progression controller 241 determines whether input portion operation information that instructs the starting of the game is included in the received operation information every time the transmitted operation information is received. When the game progression controller 241 determines that input portion operation information that instructs the starting of the game is included in the received operation information, the game is started, and the game progression controller 241 instructs the determination portion 242, the identification portion 243, and the object controller 244 to execute an object change process.

Additionally, the game progression controller 241 determines whether an instruction to restart the game is included in the input portion operation information of the received operation information every time the transmitted operation information is received. When the game progression controller 241 determines that an instruction to restart the game is included in the input portion operation information of the received operation information, the game is started again, and the game progression controller 241 instructs the determination portion 242, the identification portion 243, and the object controller 244 to execute the object change process.

Also, when the execution of the object change process is complete, the game progression controller 241 instructs the determination portion 242, the identification portion 243, the object controller 244, and the parameter controller 245 to execute a parameter change process.

In addition, the game progression controller 241 determines whether the game is over. For example, the game progression controller 241 determines that the game is over when the third object OJ3 has moved within a range of an end determination distance of the first object OJ1. Furthermore, the game progression controller 241 determines that the game is over when an instruction to end the game is included in the input portion operation information of the received operation information.

Furthermore, when the game progression controller 241 determines that the game is over, it ends the execution of the parameter change process.

The determination portion 242 determines whether the received operation information satisfies the first operation information condition every time the transmitted operation information is received. Additionally, the determination portion 242 determines whether the received operation information satisfies the second operation information condition every time the transmitted operation information is received.

The identification portion 243 identifies, as an object operation device, the operation device that has transmitted the operation information when the determination portion 242 determines that the received operation information has satisfied the first operation information condition. Also, the identification portion 243 identifies, as a parameter operation device, the operation device that has transmitted the operation information when the determination portion 242 determines that the received operation information has satisfied the second operation information condition.

Additionally, the identification portion 243 determines whether the operation device that has been identified as a parameter operation device is an object operation device. When the operation device that has been identified as a parameter operation device is an object operation device, the identification portion 243 does not identify, as an object operation device, the operation device that has been identified as a parameter operation device, and identifies, as an object operation device, the operation device different from the operation device that has been identified as a parameter operation device.

The object controller 244 changes the first object OJ1, based on the operation information transmitted from the object operation device at specified time intervals. When it is determined that the operation information from the object operation device satisfies the first operation information condition, the object controller 244 may move the first object OJ1 from the predetermined first object position PO1 to the predetermined second object position PO2.

Additionally, when it is determined that the operation information from the object operation device satisfies the first operation information condition, the object controller 244 may calculate the travel direction and the travel distance of the second object OJ2 based on the operation information transmitted from the object operation device at specified time intervals, and move the second object OJ2 based on the calculated travel direction and travel distance.

Additionally, the object controller 244 moves the second object based on the parameter changed by the later-mentioned parameter controller 245.

Furthermore, the object controller 244 (i) reads, as information regarding a movable range, the information regarding the line-of-sight direction and the field of view of the virtual camera C, which is stored in the memory 22, and (ii) corrects the position of the second object OJ2 to be within the movable range when the second object OJ2, which moves based on the calculated travel direction and travel distance, is out of the movable range.

The parameter controller 245 changes the parameter based on the operation information transmitted from the parameter operation device at specified time intervals.

The display processor 246 (i) generates an image that (a) is projected on a specified two-dimensional screen plane arranged in the line-of-sight direction of the virtual camera C and (b) shows the virtual space V within the field of view FV and (ii) displays the generated image on the display portion 23.

Additionally, when the object within the virtual space V is changed (moved, deformed, or the like), if the changed object is included in the field of view FV, the display processor 246 (i) generates an image that (a) includes the changed object and (b) shows the virtual space V within the field of view FV and (ii) displays the generated image on the display portion 23.

Additionally, when the identification portion 243 identifies that the operation device identified by the parameter operation device is the object operation device, the display processor 246 (i) superimposes on the image showing the virtual space V an image showing the gauge G corresponding to the parameter changed by the parameter controller 245 and (ii) displays it on the display portion 23.

Figure 15:
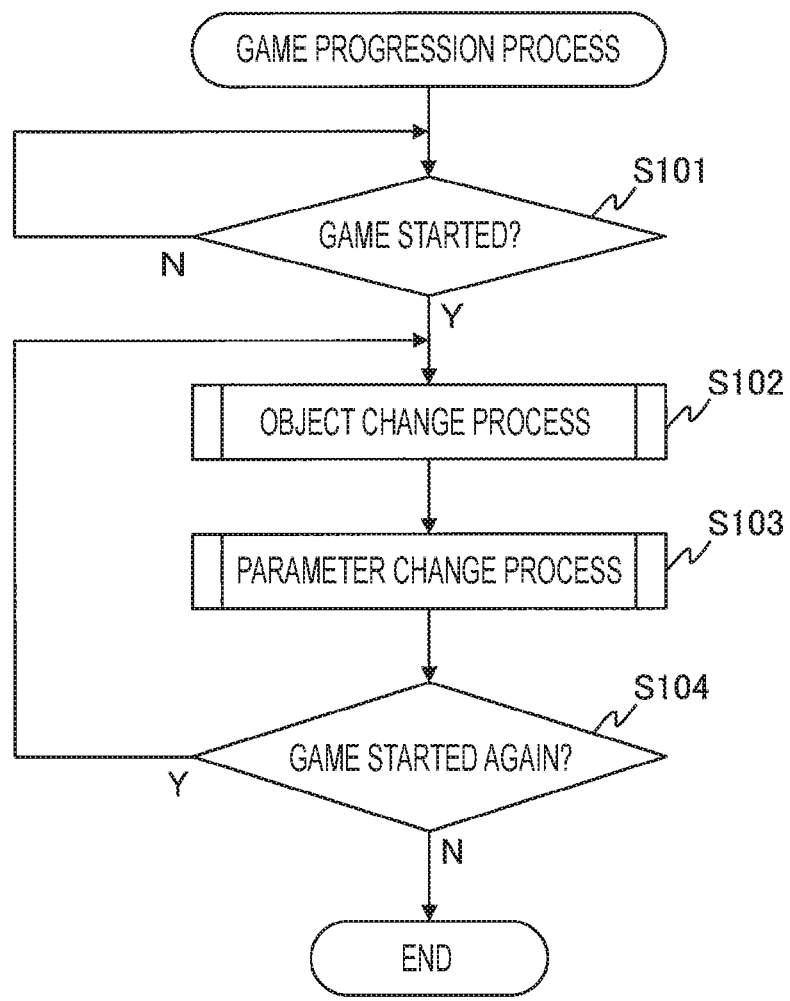
FIG. 15 is a diagram showing an example of an operation flow of a game progression process.

FIG. 15 is a diagram showing an example of an operation flow of the game progression process by the processor 24 of the game processing device 2.

First, the game progression controller 241 (i) receives, via the communication portion 21, the operation information output by the first operation device 3 and the second operation device 4 and (ii) determines whether the input portion operation information for instructing to start the game is included in the received operation information (step S101). Furthermore, the operation information including the input portion operation information for instructing to start the game is transmitted, via the first communication portion 31 or the second communication portion 41, from the first transmitter 361 or the second transmitter 461 as the player operates (i) a specified first input portion 33 of the first operation device 3 or (ii) a specified second input portion 43 of the second operation device 4.

If the input portion operation information for instructing to start the game is not included in the received operation information (step S101-No), the game progression controller 241 returns the process to step S101.

If the input portion operation information for instructing to start the game is included in the received operation information (step S101—Yes), the determination portion 242, the identification portion 243, and the object controller 244 execute an object change process (step S102). Furthermore, details of the object change process will be described later.

Next, the determination portion 242, the identification portion 243, the object controller 244, and the parameter controller 245 execute a parameter change process (step S103). Furthermore, details of the parameter change process will be described later.

Next, the game progression controller 241 (i) receives, via the communication portion 21, the operation information output by the first operation device 3 and the second operation device 4 and (ii) determines whether an instruction to start the game again is included in the input portion operation information of the received operation information (step S104). If it is determined that an instruction to start the game again is included in the input portion operation information in the received operation information (step S 104—Yes), the game progression controller 241 returns the process to step S102.

If it is determined that an instruction to start the game again is not included in the input portion operation information in the received operation information (step S104-No), the game progression controller 241 ends the game progression process.

Figure 16:
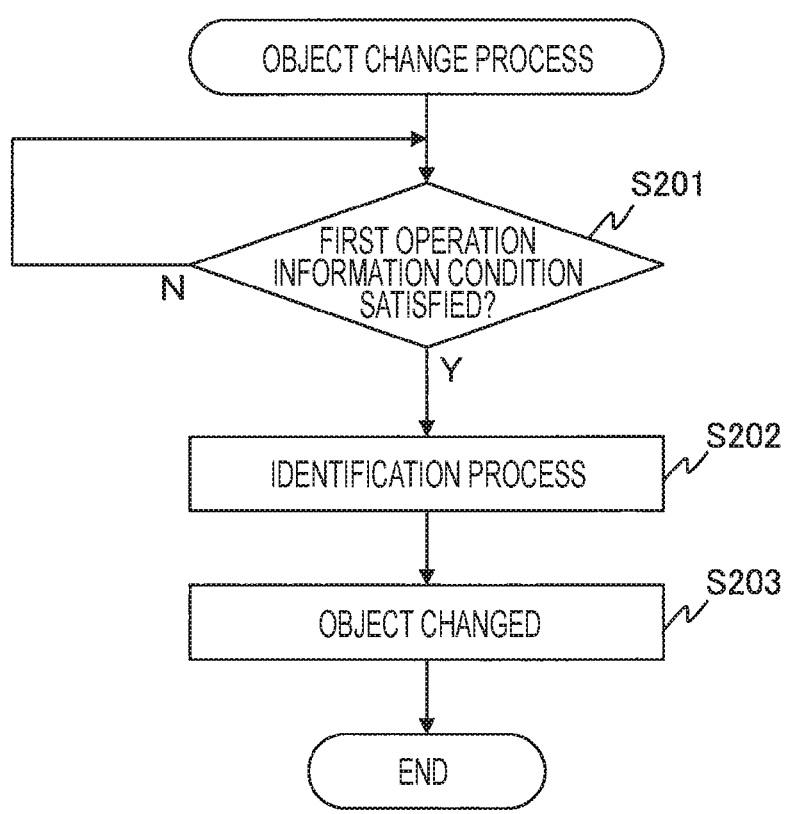
FIG. 16 is a diagram showing an example of an operation flow of an object change process.

FIG. 16 is a diagram showing an example of an operation flow of the object change process by the determination portion 242, the identification portion 243, and the object controller 244 of the game processing device 2. The object change process shown in FIG. 16 is executed in step S102 of FIG. 15.

First, the determination portion 242 determines whether the received operation information satisfies the first operation information condition every time the operation information transmitted from the first operation device 3 and the second operation device 4 at specified time intervals is received (step S201).

If it is not determined that the received operation information satisfies the first operation information condition (step S201-No), the determination portion 242 returns the process to step S201.

If it is determined that the received operation information satisfies the first operation information condition (step S201—Yes), the identification portion 243 identifies, as an object operation device, the operation device that has transmitted the operation information (step S202).

Next, the object controller 244 changes the first object OJ1 based on the operation information transmitted from the object operation device at specified time intervals (step S203).

Once the process of step S203 is executed, the object change process is ended.

Figure 17:
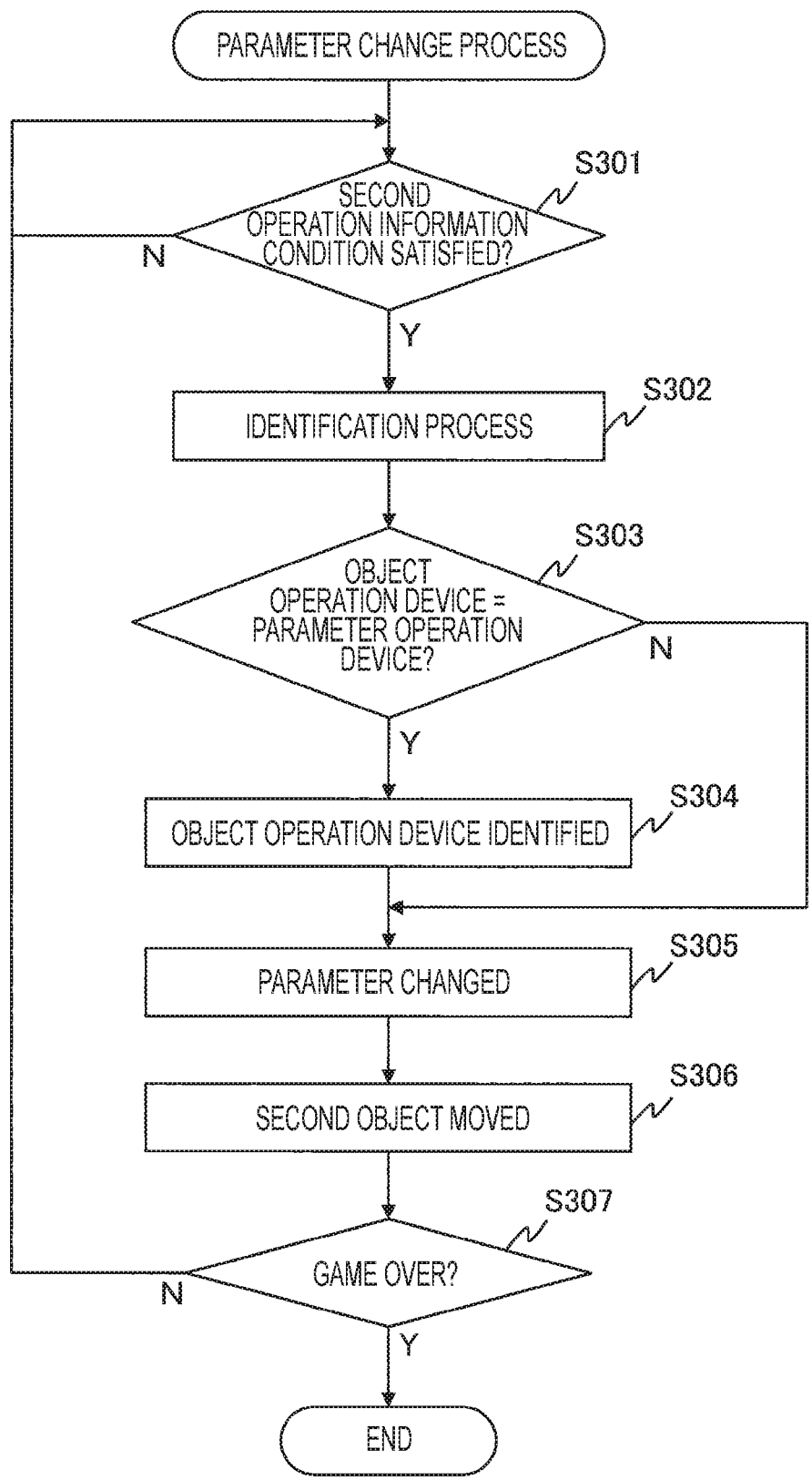
FIG. 17 is a diagram showing an example of an operation flow of a parameter change process.

FIG. 17 is a diagram showing an example of an operation flow of the parameter change process by the game progression controller 241, the determination portion 242, the identification portion 243, the object controller 244, and the parameter controller 245 of the game processing device 2. The parameter change process shown in FIG. 17 is executed in step S103 of FIG. 15.

First, the determination portion 242 determines whether the operation information received, at specified time intervals, from the first operation device 3 and the second operation device 4 satisfies the second operation information condition (step S301).

When it is not determined that the received operation information satisfies the second operation information condition (step S301—No), the determination portion 242 returns the process to step S301.

When it is determined that the received operation information satisfies the second operation information condition (step S301—Yes), the identification portion 243 identifies, as a parameter operation device, the operation device that has transmitted the operation information (step S302).

Next, the identification portion 243 determines whether the operation device identified as a parameter operation device in step S302 is an object operation device (step S303).

If the operation device identified as a parameter operation device is not an object operation device (step S303—No), the later-described step S305 is executed by the parameter controller 245.

If the operation device identified as a parameter operation device is an object operation device (step S303—Yes), the identification portion 243 identifies, as an object operation device, the operation device different from the operation device identified as a parameter operation device (step S304).

Next, the parameter controller 245 changes the parameter based on the operation information transmitted, at specified time intervals, by the parameter operation device (step S305).

Next, the object controller 244 moves the second object based on the changed parameter (step S306).

Next, the game progression controller 241 determines whether the game is over (step S307).

When it is determined that the game is not over (step S307—No), the game progression controller 241 returns the process to step S301.

When it is determined that the game is over (step S307—Yes), the game progression controller 241 ends the parameter change process.

As described above, the parameter value related to an object to be operated can automatically be controlled by the player operating any one of the plurality of operation devices. Because of this, the player can enjoy the game without setting the operation device, and operability of the operation device can be improved by the game system of at least several modes of this invention.

Furthermore, the above modes can be implemented with appropriate changes as follows. For example, the game processing device 2 of at least several modes of this invention may be connected to a display device by wire or wireless, and display on the display device the same image as the image displayed on the display portion 23. The display device is, for example, a television receiver and is provided with a liquid crystal display, an organic EL display, or the like. The display device displays an image according to the image data supplied by the processor 24. In this case, the same image as the image on the display device may be displayed on the display portion 23, or if the image is displayed on the display device, it may not be displayed on the display portion 23. Additionally, the display portion 23 may not be provided with the game processing device 2. Furthermore, the display device may also be a Head Mounted Display (HMD).

Additionally, when the second object OJ2 reaches the arrival position OP3, according to the relationship between the second object OJ2 and the third object OJ3, the object controller 244 may execute an automatic travel process that automatically moves the third object OJ3 toward the second object OJ2. For example, if attributes of the second object OJ2 and the third object OJ3 are respectively stored in the memory 22, and the attribute of the second object OJ2 matches that of the third object OJ3, the object controller 244 executes the automatic travel process. Alternatively, if parameters of the second object OJ2 and the third object OJ3 are respectively stored in the memory 22, an evaluation value (for example, a degree of attraction) is calculated based on the parameters of the second object OJ2 and the third object OJ3, and when the evaluation value exceeds a specified setting value, the object controller 244 executes the automatic travel process. When the second object OJ2 reaches the arrival position PO3, the third object OJ3 that becomes subject to the automatic travel process may be limited to one positioned within a specified setting range from the arrival position PO3.

In addition, the game provided by the game device 1 of at least several modes of this invention is not limited to a fishing game. For example, sports games other than a fishing game may be provided by the game device 1 of at least several modes of this invention.

For example, by the game device 1 of at least several modes of this invention, a sports game may be provided, for example, a golf game in which a character operated by a player golfs using a golf club, a baseball game in which a character operated by a player plays baseball using a baseball bat, or the like. In such a sports game, a game proceeds in which a character grasps the first object OJ1 imitating a golf club, a baseball bat, or the like with both hands, and uses the object OJ1.

In this case, the player grasping the first operation device 3 with his left hand and the second operation device 4 with his right hand performs a movement of swinging a golf club, a baseball bat, or the like. Respective motion sensors of the first operation device 3 and the second operation device 4 output respective pieces of operation information of the first operation device 3 and the second operation device 4.

Once the respective pieces of the operation information of the first operation device 3 and the second operation device 4 are obtained, the game processing device 2 determines which of the first operation device 3 and the second operation device 4 is being grasped by the dominant hand. For example, every time the operation information is received that has been transmitted from the first operation device 3 and the second operation device 4, respectively, the determination portion 242 of the game processing device 2 calculates the respective travel distances of the first operation device 3 and the second operation device 4, which have traveled within the target period, based on all or part of the acceleration information in the target period from when the acceleration shown by the acceleration information included in the operation information exceeds a specified numerical value until it falls below the specified numerical value. Furthermore, the acceleration shown by the acceleration information included in the operation information is, for example, a resultant acceleration combining (i) the acceleration shown by the X-axis direction acceleration information, (ii) the acceleration shown by the Y-axis direction acceleration information, and (iii) the acceleration shown by the Z-axis direction acceleration information.

Additionally, the identification portion 243 identifies, as an operation device grasped by the dominant hand, the operation device with the longer travel distance.

Next, when a swinging-over-the-head motion is performed, the object controller 244 determines, as a top position timing at which the player swings downward from a top position, a timing at which the direction of the acceleration shown by the acceleration information included in the operation information transmitted from the first operation device 3 and the second operation device 4, respectively, has changed. Next, the object controller 244 determines, as an impact timing, the timing at which the acceleration shown by the acceleration information included in the operation information transmitted from the first operation device 3 and the second operation device 4, respectively, becomes maximum. Next, the object controller 244 calculates a rotation angle about the X axis of the first operation device 3 and the second operation device 4, based on the X-axis angular velocity information that (i) has been received in the period from the top position timing to the impact timing and (ii) is included in the operation information transmitted from the first operation device 3 and the second operation device 4, respectively. Additionally, the object controller 244 determines the type of a travel trajectory of a second object OJT2 imitating a ball, based on a difference value obtained by subtracting the rotation angle of another operation device from the rotation angle of the operation device identified as being grasped by the dominant hand. For example, if the difference value is more than a specified value, the object controller 244 moves the second object OJT2 so as to hook the second object OJT2. If the difference value is less than a specified value, the object controller 244 moves the second object OJT2 so as to slice the second object OJT2. Additionally, the object controller 244 may determine the type of the travel trajectory of the ball, using only one of (i) the rotation angle of the operation device identified as being grasped by the dominant hand and (ii) the rotation angle of the other operation device.

Based on the transmitted operation information, the object controller 244 calculates, at the top position timing, the angle between (i) the X-axis direction of the operation device identified as being grasped by the dominant hand and (ii) the horizontal plane. The object controller 244 calculates the travel distance of the second object OJT2, based on the calculated angle. In this way, because follow-through can be assumed using the angle of the operation device during backswing, the travel distance of the second object OJT2 can be calculated based on the angle, and a load of calculation processing will be reduced.

Additionally, a fighting game may be provided by the game device 1 of at least several modes of this invention. For example, when a character operated by a player grasps the first object OJT1 imitating a weapon or the like and plays against an enemy character, every time the operation information transmitted from the first operation device 3 and the second operation device 4, respectively, is received, the determination portion 242 determines whether the acceleration shown by the acceleration information included in the operation information has exceeded a specified acceleration setting value.

When it is determined the acceleration related to both the first operation device 3 and the second operation device 4 has exceeded a specified angular velocity setting value, the identification portion 243 determines that the character operated by the player grasps the first object OJT1 with both hands.

Furthermore, the object controller 244 moves the first object OJT1 in a direction and at a velocity according to the acceleration related to both the first operation device 3 and the second operation device 4. The display processor 246 displays the character grasping the first object OJT1 with both hands and displays the first object OJT1 that is moving.

Additionally, when it is determined that the acceleration related to one of the first operation device 3 and the second operation device 4 exceeds a specified angular velocity setting value, the identification portion 243 determines that the hand of the character corresponding to one of the operation devices is grasping the first object OJT1. Next, the object controller 244 moves the first object OJT1 in the direction and at the velocity according to the acceleration related to the one of the first operation device 3 and the second operation device 4.

In addition, the object controller 244 moves the first object OJT1 in the direction and at the velocity according to the acceleration related to one of the operation devices. The display processor 246 displays the character grasping the first object OJT1 with the hand of the character corresponding to one of the operation devices and displays the first object OJT1 that is moving.

The game provided by the game device 1 of at least several modes of this invention is not limited to the above examples, but may be any game as long as it is a virtual reality (VR) game, within a virtual space V, using an object OJT1 grasped by a character or the like. Furthermore, the character or the like grasping the object OJT1 does not need to be displayed.

Additionally, the process that identifies an operation device as a parameter operation device may be a process based on the relationship between (i) the operation information received from the first operation device 3 and (ii) the operation information received from the second operation device 4. For example, when a specified motion is a reciprocating motion, displacement of one cycle in the reciprocating motion based on the operation information received from the first operation device 3 is compared with displacement of one cycle in the reciprocating motion based on the operation information received from the second operation device 4, and the operation device related to the larger displacement may be identified as the parameter operation device.

In addition, when the determination portion 242 determines that the received operation information satisfies the first operation information condition, the identification portion 243 may (i) identify, as an object operation device, the operation device that has transmitted the operation information and (ii) identify, as a parameter operation device, the operation device that has not been identified as an object operation device.

It is desired that those skilled in the art understand that various changes, substitutions, and modifications can be made thereto without departing from the spirit and scope of this disclosure.

EXPLANATION OF SYMBOLS

1 Game device
2 Game processing device
21 Communication portion
22 Memory
23 Display portion
24 Processor
241 Game progression controller
242 Determination portion
243 Identification portion
244 Object controller
245 Parameter controller
246 Display processor
3 First operation device
31 First communication portion
32 First memory
33 First input portion
34 First acceleration detector
35 First angular velocity detector
36 First processor
361 First transmitter
4 Second operation device
41 Second communication portion
42 Second memory
43 Second input portion
44 Second acceleration detector
45 Second angular velocity detector
46 Second processor
461 Second transmitter

The invention claimed is:

1. A game device comprising: a
memory that stores an image of a first object;
first and second operation devices for outputting operation information based on a movement of a first player who uses both of the first and second operation devices; and
circuitry configured to
    display at least the image of the first object,
    determine whether the operation information that has been output satisfies a specified condition, and
    identify, as a parameter operation device, among the first and second operation devices used by the first player, the operation device that has output the operation information satisfying the specified condition,
    identifying, an as object operation device, among the first and second operation devices, the operation device different from the parameter operation device,
    change the image of the first object according to the operation information from the object operation device, and
    change a parameter value related to the first object, according to the operation information from the parameter operation device, without changing the image of the first object.

2. The game device according to claim 1, wherein the circuitry is configured to:
display the parameter value in a display mode that corresponds to the change.

3. The game device according to claim 1, wherein:
each of the first and second operation devices has a transmitter that outputs the operation information, which has been measured by a motion sensor; and
the specified condition is that, based on the operation information output from the transmitter, it is determined that the operation device having the transmitter is performing a specified motion.

4. The game device according to claim 3, wherein:
the specified motion is a reciprocating motion of the parameter operation device; and the
circuitry is configured to increase the parameter value as the number of reciprocating motions of the parameter operation device per specified time increases.

5. The game device according to claim 3, wherein:
the specified motion is a reciprocating motion of the parameter operation device; and the circuitry is configured to increase the parameter value as displacement of one cycle of reciprocating motion of the parameter operation device per specified time increases.

6. The game device according to claim 1, wherein:
the memory stores information related to a virtual space, and the
circuitry is configured to
   move a second object related to the first object within the virtual space, based on the paramete value changed by the circuitry; and
   display an image of the second object that moves within the virtual space.

7. The game device according to claim 1, wherein: the circuitry is configured to
   receive, at specified time intervals, the operation information output from the first and second operation devices,
   identify the fist operation device as the parameter operation device in response to the operation information output by the first operation device satisfying the specified condition, and
   subsequently identify the second operation device as the parameter operation device in response to the operation information output by the second operation device satisfying the specified condition.

8. A control method of a game device comprising (i) a memory that stores an image of a first object and (ii) first and second operation devices for outputting operation information based on a movement of a first player who uses both of the first and second operation devices, the control method comprising:
   displaying at least an image of the first object;
   determining whether the operation information that has been output satisfies a specified condition;
   identifying, as a parameter operation device, among the first and second operation devices used by the first player, the operation device that has output the operation information satisfying the specified condition;
   identifying, as an object operation device, among the first and second operation devices, the operation device different from the parameter operation device;
   changing the image of the first object according to the operation information from the object operation device; and
   changing a parameter value related to the first object, according to the operation information from the parameter operation device, without changing the image of the first object.

9. The control method according to claim 8, further comprising:
   receiving, at specified time intervals, the operation information output from the first and second operation devices;
   identifying the first operation device as the parameter operation device in response to the operation information output by the first operation device satisfying the specified condition; and
   subsequently identifying the second operation device as the parameter operation device in response to the operation information output by the second operation device satisfying the specified condition.

10. A non-transitory computer-readable recording medium storing a control program causing a game device, comprising (i) a memory that stores an image of a first object and (ii) first and second operation devices for outputting operation information based on a movement of a first player who uses both of the first and second operation devices, to execute:
   displaying at least die image of the first object;
   determining whether the operation information that has been output satisfies a specified condition;
   identifying, a parameter operation device, among the first and second operation devices used by the fist player, the operation device that has output the operation information satisfying the specified condition;
   identifying, as an object operation device, among the first and second operation devices, the operation device different from the parameter operation device;
   changing the image of the first object according to the operation information from the object operation device; and
   changing a parameter value related to the fist object, according to the operation information from the parameter operation device, without changing the image of the first object.

11. The non-transitory computer-readable recording medium according to claim 10, the control program causing the game device to further execute:
   receiving, at specified time intervals, the operation information output from the first and second operation devices;
   identifying the first operation device as the parameter operation device in response to the operation information output by the first operation device satisfying the specified condition; and
   subsequently identifying the second operation device as the parameter operation device in response to the operation information output by the second operation device satisfying the specified condition.

* * * * *